United States Patent
Hyder et al.

(10) Patent No.: US 7,707,203 B2
(45) Date of Patent: *Apr. 27, 2010

(54) JOB SEEKING SYSTEM AND METHOD FOR MANAGING JOB LISTINGS

(75) Inventors: Adam Hyder, Los Altos, CA (US); Sandeep Khanna, Los Altos, CA (US); Joseph Ting, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1161 days.

This patent is subject to a terminal disclaimer.

(21) Appl. No.: 11/173,656

(22) Filed: Jun. 30, 2005

(65) Prior Publication Data

US 2006/0229899 A1    Oct. 12, 2006

Related U.S. Application Data

(60) Provisional application No. 60/661,280, filed on Mar. 11, 2005.

(51) Int. Cl.
G06F 7/00 (2006.01)
G06F 17/00 (2006.01)

(52) U.S. Cl. ............... 707/710; 707/722; 707/736; 707/755; 707/756; 707/811; 707/947

(58) Field of Classification Search ............. 707/710, 707/722, 736, 755, 756, 811, 947
See application file for complete search history.

(56) References Cited

U.S. PATENT DOCUMENTS

| | | | |
|---|---|---|---|
| 5,655,130 A | 8/1997 | Dodge et al. | |
| 5,805,747 A * | 9/1998 | Bradford | 382/310 |
| 6,370,510 B1 | 4/2002 | McGovern et al. | |
| 6,571,243 B2 * | 5/2003 | Gupta et al. | 707/6 |
| 6,681,223 B1 * | 1/2004 | Sundaresan | 707/6 |
| 6,711,589 B2 * | 3/2004 | Dietz | 707/104.1 |
| 6,757,674 B2 * | 6/2004 | Wiens et al. | 707/3 |
| 7,191,176 B2 | 3/2007 | McCall et al. | |

(Continued)

OTHER PUBLICATIONS

Notification of Concerning Transmittal of International Preliminary Report on Patentability PCT/US2006/008906).

(Continued)

*Primary Examiner*—John R. Cottingham
*Assistant Examiner*—Susan F Rayyan
(74) *Attorney, Agent, or Firm*—James J. DeCarlo; Greenberg Traurig, LLP

(57) ABSTRACT

A computer system and method for capture, managing and presenting data obtained from various often unrelated postings via the Internet for examination by a user. This system includes a scraping module having one or more scraping engines operable to scrape information data sets from listings on the corporate sites and web sites, direct feeds, and other sources, wherein the scraping module receives and stores the scraped listing information data sets in a database. The system also has a management platform coordinating all operation of and communication between the sources, system administrators and processing modules. The processing modules in the platform include scraping management module analyzing selected scraped data stored in the database, and a categorization module that examines and categorizes each data set stored in the database into one or more of a predetermined set of categories and returns categorized data sets to the database.

24 Claims, 17 Drawing Sheets

U.S. PATENT DOCUMENTS

| | | | |
|---|---|---|---|
| 7,272,610 | B2 | 9/2007 | Torres |
| 2001/0049674 | A1* | 12/2001 | Talib et al. ............... 707/1 |
| 2002/0026452 | A1 | 2/2002 | Baumgarten et al. |
| 2002/0072946 | A1 | 6/2002 | Richardson |
| 2002/0091689 | A1* | 7/2002 | Wiens et al. ............... 707/6 |
| 2002/0120532 | A1 | 8/2002 | McGovern et al. |
| 2002/0143573 | A1 | 10/2002 | Bryce et al. |
| 2003/0009437 | A1 | 1/2003 | Seiler et al. |
| 2003/0014294 | A1 | 1/2003 | Yoneyama et al. |
| 2003/0023474 | A1 | 1/2003 | Helweg-Larsen |
| 2003/0033292 | A1 | 2/2003 | Meisel et al. |
| 2003/0046311 | A1* | 3/2003 | Baidya et al. ............... 707/200 |
| 2003/0061242 | A1 | 3/2003 | Warmer et al. |
| 2003/0088465 | A1 | 5/2003 | Monteverde |
| 2003/0097357 | A1 | 5/2003 | Ferrari et al. |
| 2003/0142128 | A1 | 7/2003 | Reulein et al. |
| 2003/0172145 | A1 | 9/2003 | Nguyen |
| 2003/0204439 | A1 | 10/2003 | Cullen |
| 2003/0216930 | A1 | 11/2003 | Dunham et al. |
| 2004/0064477 | A1 | 4/2004 | Swauger |
| 2004/0107112 | A1 | 6/2004 | Cotter |
| 2004/0107123 | A1 | 6/2004 | Haffner et al. |
| 2004/0267549 | A1 | 12/2004 | Anderson et al. |
| 2004/0267735 | A1 | 12/2004 | Melham |
| 2005/0004927 | A1 | 1/2005 | Singer |
| 2005/0076293 | A1* | 4/2005 | Beresnevichiene ............... 715/514 |
| 2005/0120294 | A1 | 6/2005 | Stefanison et al. |
| 2005/0125408 | A1 | 6/2005 | Somaroo et al. |
| 2005/0154699 | A1 | 7/2005 | Lipkin et al. |
| 2005/0209955 | A1 | 9/2005 | Underwood et al. |
| 2005/0210514 | A1 | 9/2005 | Kittlaus et al. |
| 2005/0216295 | A1 | 9/2005 | Abrahamsohn |
| 2006/0010108 | A1* | 1/2006 | Greenberg ............... 707/3 |
| 2006/0100919 | A1* | 5/2006 | Levine ............... 705/11 |
| 2006/0155698 | A1* | 7/2006 | Vayssiere ............... 707/6 |
| 2006/0206448 | A1 | 9/2006 | Hyder |
| 2006/0206505 | A1 | 9/2006 | Hyder |
| 2006/0206517 | A1* | 9/2006 | Hyder et al. ............... 707/102 |
| 2006/0206584 | A1 | 9/2006 | Hyder |
| 2006/0212466 | A1 | 9/2006 | Hyder |
| 2006/0229896 | A1 | 10/2006 | Rosen et al. |
| 2006/0242013 | A1 | 10/2006 | Agarwal et al. |
| 2007/0033064 | A1* | 2/2007 | Abrahamsohn ............... 705/1 |
| 2007/0101065 | A1 | 5/2007 | Walker |
| 2007/0214140 | A1* | 9/2007 | Dom et al. ............... 707/7 |
| 2008/0183488 | A1* | 7/2008 | Vianello ............... 705/1 |

OTHER PUBLICATIONS

Notification of Transmittal of the International Search Report and the Written Opinion of the International Searching Authority, or Declaration (PCT/US2006/008907).

Notification of Transmittal of the International Search Report and the Written Opinion of the International Searching Authority, or the Declaration (PCT/US06/08893).
Official Action from the United States Patent and Trademark Office for U.S. Appl. No. 11/174,393 dated Apr. 3, 2009.
Official Action from the United States Patent and Trademark Office for U.S. Appl. No. 11/174,393 dated Oct. 24, 2008.
Official Action from the United States Patent and Trademark Office for U.S. Appl. No. 11/174,393 dated May 1, 2008.
Official Action from the United States Patent and Trademark Office for U.S. Appl. No. 11/174,393 dated Jul. 11, 2007.
Official Action from the United States Patent and Trademark Office for U.S. Appl. No. 11/174,393 dated Mar. 9, 2007.
Official Action from the United States Patent and Trademark Office for U.S. Appl. No. 11/174,393 dated Sep. 27, 2006.
Official Action from the United States Patent and Trademark Office for U.S. Appl. No. 11/173,837 dated Mar. 31, 2009.
Official Action from the United States Patent and Trademark Office for U.S. Appl. No. 11/173,837 dated Dec. 11, 2008.
Official Action from the United States Patent and Trademark Office for U.S. Appl. No. 11/173,837 dated May 29, 2008.
Official Action from the United States Patent and Trademark Office for U.S. Appl. No. 11/173,837 dated Jan. 4, 2008.
Official Action from the United States Patent and Trademark Office for U.S. Appl. No. 11/173,837 dated Jun. 6, 2007.
Official Action from the United States Patent and Trademark Office for U.S. Appl. No. 11/173,837 dated Mar. 9, 2007.
Official Action from the United States Patent and Trademark Office for U.S. Appl. No. 11/173,837 dated Sep. 29, 2006.
Official Action from the United States Patent and Trademark Office for U.S. Appl. No. 11/173,470 dated Mar. 31, 2009.
Official Action from the United States Patent and Trademark Office for U.S. Appl. No. 11/173,470 dated Oct. 7, 2008.
Official Action from the United States Patent and Trademark Office for U.S. Appl. No. 11/173,470 dated May 29, 2008.
Official Action from the United States Patent and Trademark Office for U.S. Appl. No. 11/173,470 dated Jan. 4, 2008.
Official Action from the United States Patent and Trademark Office for U.S. Appl. No. 11/173,470 dated Jun. 7, 2007.
Official Action from the United States Patent and Trademark Office for U.S. Appl. No. 11/173,470 dated Mar. 9, 2007.
Official Action from the United States Patent and Trademark Office for U.S. Appl. No. 11/173,470 dated Sep. 29, 2006.
Official Action from the United States Patent and Trademark Office for U.S. Appl. No. 11/372,497 dated Mar. 18, 2009.
Official Action from the United States Patent and Trademark Office for U.S. Appl. No. 11/372,497 dated Oct. 23, 2008.
Official Action from the United States Patent and Trademark Office for U.S. Appl. No. 11/372,497 dated Apr. 7, 2008.
Official Action from the United States Patent and Trademark Office for U.S. Appl. No. 11/372,528 dated Apr. 1, 2009.

* cited by examiner

Fig. 11

| | | Quality Manager Failed Jobs | Jobs Total | Percent Failed |
|---|---|---|---|---|
| | Company Name | | | |
| | | 2203 | 24466 | 9.00 |
| | DOMINICKS | 604 | 604 | 100.00 |
| | Northeastern University | 157 | 157 | 100.00 |
| | Fidelity Investments Institutional Services Company, Inc | 20 | 20 | 100.00 |
| | DJ ORTHOPEDICS INC | 20 | 20 | 100.00 |
| | Dal-Tile International Inc. | 20 | 20 | 100.00 |
| | ConocoPhillips | 16 | 16 | 100.00 |
| | Cooper Tire & Rubber Company | 6 | 6 | 100.00 |
| 2005-02-22 | Cross Match Technologies | 4 | 4 | 100.00 |
| | FISHER COMMUNICATIONS | 4 | 4 | 100.00 |
| | Career Step | 4 | 4 | 100.00 |
| | UST INC | 2 | 2 | 100.00 |

Fig. 14

| Report: | Country: |
|---|---|
| Industry | Jobs Total |
| Accounting_Finance | 7019 |
| Advertising_Public_Relations | 277 |
| Arts_Entertainment_Publishing | 811 |
| Banking_Mortgage | 1468 |
| Clerical_Administrative | 7502 |
| Construction_Facilities | 1971 |
| Customer_Service | 1157 |
| Education_Training | 2757 |
| Engineering_Architecture | 8322 |
| AZ | 2455 |
| BC | 2 |
| BE | 1 |
| CA | 8944 |
| CN | 3 |
| CO | 1727 |
| CT | 1023 |
| DC | 843 |
| DE | 323 |
| DK | 2 |

Fig. 16

JOB SEEKING SYSTEM AND METHOD FOR MANAGING JOB LISTINGS

CROSS REFERENCE TO RELATED APPLICATIONS

This application claims the benefit of priority of U.S. Provisional Patent Application Ser. No. 60/661,280, filed Mar. 11, 2005. This application is related to U.S. patent application Ser. No. 11/174,393, filed Jun. 30, 2005, U.S. patent application Ser. No. 11/173,837, filed Jun. 30, 2005, and U.S. patent application Ser. No. 11/173,470, filed Jun. 30, 2005, the disclosures of which are hereby incorporated by reference in their entirety.

BACKGROUND

1. Field

This disclosure relates to computer software and more particularly to a software system and method for managing data listings.

2. General Background

A challenge common to companies that need to manage and present listings of data to customers, such as real estate brokers, employment recruiters, and travel agencies is conveying the information they have in a succinct and intelligent manner such that the users of such data gain the particular information they seek in an optimum, efficient and effective manner in the shortest period of search time. Another challenge is the need to track data flow, information transfer between various business units and management entities utilizing listing data.

One illustrative example involves the field of employment recruitment. The challenge for companies seeking to attract talented employees is finding the best set of candidates for the position available. The challenge for job seekers is finding the right job. One standard practice among human resource departments is to create a job description for each open position, then advertise the position along with the description. Recruiters and job seekers then have to review and analyze these descriptions in order to determine a match between job seekers and particular jobs.

A number of searching tools are available to a person searching on the Internet for the right job based on his or her skill set. Typical searching tools currently available require the job seeker to select various criteria in the form of keywords, such as desired locations, types of jobs, desired compensation levels, etc. Similarly, the employers provide, in addition to the job description, levels of skill, education, years of experience, etc. required to be considered for a particular job. Searching tools then look up the seeker's keywords in a data base of job descriptions and return, or display those job descriptions that contain the job seeker's keywords. However, available search tools still either often require the employer and the job seeker to each sift through a large number of so-called search results or can return no search results at all if the criteria provided is too specific or narrow.

In general, a number of searching tools are available to a person searching on the Internet for any data that is compiled in listings form, for example, a new home in a particular area. Typical real estate searching tools currently available require the home buyer or the buyer's agent to select various criteria in the form of keywords, such as desired locations, types of house, lot size, school system, street location preferences, price range, etc. A listing real estate broker provides, typically in a multiple listing service, in addition to the home description, pictures and other data such as square footage of the lot, the house, and number of bedrooms and baths, for example. Searching tools then look up the user's keywords in a data base of homes and return, or display, those homes that contain the user's keywords. However, available search tools still either often require the user, either the real estate broker, or the potential buyer, or other user, to each sift through a large number of so-called search results on multiple sites. It would be desirable, then, to provide a search management system that more effectively collects the listings data, normalizes the data and manages the interfaces between users and providers of listings data.

SUMMARY

The system described herein incorporates Platform for Advanced Listing Management software system for managing searching tools for any kind of listing data such as job postings, resume listings, real estate listings, product listings, etc. The system is fully distributable among several machines and is scalable. Each module described below within the software system is scalable and may include multiple instances dictated by the amount of data to be handled and processed therein.

An embodiment of the system described herein is a computer software system for managing capture and processing of listing information data captured through a data network from a plurality of sources for compilation into a searchable data structure. The system includes an administrative portal module providing system administration and operational control through a network interface, and one or more listing manager modules, responsive to instructions provided via the administrative portal module, operable to control access to the sources, control retrieval of listing information data and process the listing information data received from those sources. Each of the listing manager modules controls task managers to categorize the listing information data, examine portions of the categorized listing information data for conformance to predetermined quality criteria, and store the categorized listing information data for use in a search bank.

Each listing manager module includes one or more task managers that each comprise a scraping management module coordinating operation of and communication between one or more scraping engines to obtain scraped data sets from sites identified by a site management module in the administrative portal module and store the scraped data sets in a database. The listing manager module also preferably includes a quality management module coupled to the scraping management module analyzing each scraped data set stored in the database for conformance to predetermined quality rules and a listing data categorization module operable to examine and categorize each data set stored in the database into one or more of a predetermined set of categories and return categorized data sets to the database, and a search bank synchronizer communicating with the database for compiling and transferring categorized data sets from the database to the search bank.

An embodiment of an exemplary system operates through the use any available means of accessing listing information. Such means may include direct feeds, web based feeds, XML feeds, and the use of scraping technology to scour the web and obtain listing information from sites available on the Internet, and particularly the World Wide Web, although, as listing information may be distributed on other networks now known or to become known, the system and functionality described herein is applicable to any distributed information environment whereby information can be obtained by manual or automated systems.

As an exemplary implementation, job seekers and job description and job postings are described herein. However, the management system has much broader application than simply job hunting. It can be implemented with any type of data management system where listings of data or other compilations of data records are to be managed. The system described herein is modular and scalable and may be implemented as a stand alone system on a single computer or its modular functionality may be distributed among disparate computers, servers, etc. communicating through appropriate network interfaces.

A job seeker seeking information about jobs will have a larger universe of job descriptions to review when utilizing an embodiment of the system described herein. Specifically, the system makes use of scraping technology, to build a database that is populated with job descriptions. The database may also include job descriptions from other sources such as job descriptions supplied by corporations seeking applicants and/or provided by methods other than through scraping. The system receives the job descriptions and then, utilizing an internal categorization and quality management process, maximizes the quality of the information contained in each individual job description to maximize usefulness to the user and to improve the user's overall job searching experience when utilizing the system described herein.

A method of obtaining, handling and compiling listing data sets in accordance with the present disclosure includes obtaining listing information data sets from one or more listings on one or more sites available through the Internet, storing data sets corresponding to each scraped listing in a database, analyzing each data set stored in the database for conformance to predetermined quality criteria, and categorizing each data set stored in the database into one or more predetermined categories and returning the categorized data set to the database. The method further may include obtaining listing information data sets from one or more of customer sites through an XML feed, an RSS feed, and direct input from a variety of sources. The categorizing operation preferably includes determining and assigning a confidence value for each data set in each of the predetermined categories. This determination preferably, and more specifically, involves comparing text of each obtained data set with text of previously categorized data sets in a categorization database and determining a confidence value in each predetermined category for each obtained data set.

A preferred embodiment of the method of this disclosure includes operations of accessing and/or scraping job description data from one or more job listings on one or more corporate career sites or job boards, storing the scraped job description data corresponding to each scraped job listing in a database, analyzing each scraped job description data stored in the database for conformance to predetermined quality criteria, categorizing each job description stored in the database into one or more predetermined job categories and returning the categorized job descriptions to the database, and transferring categorized job description data from the database to a search bank.

The categorizing operation preferably includes operations of comparing text of each scraped job description with previously categorized job description text in a categorization database, and determining a confidence value in each predetermined category for each scraped job description. More preferably, the method includes flagging each categorized scraped job description that has a confidence value below a predetermined value for manual review, and providing a manual review interface permitting a reviewer to verify any flagged categorizations. Further, in one embodiment a computer readable medium encoding a computer program of instructions is disclosed for executing a computer process for scraping job description data from corporate career sites and job boards, the computer process comprising: scraping listing information data from one or more listings on sites available through the Internet; storing a scraped data set corresponding to each scraped listing information in a database; analyzing each scraped data set stored in the database for conformance to predetermined quality criteria; and categorizing each data set stored in the database into one or more predetermined categories and returning the categorized data set to the database. With respect to the computer readable medium, the process can further comprise flagging any scraped data set not meeting the predetermined quality criteria; permitting a manual review of flagged data sets returned to the database, and wherein the categorizing operation further comprises comparing text in each scraped data set with previously categorized data set text in a categorization database; and determining a confidence value in each predetermined category for each scraped data set.

DRAWINGS

The above-mentioned features and objects of the present disclosure will become more apparent with reference to the following description taken in conjunction with the accompanying drawings wherein like reference numerals denote like elements and in which:

FIG. 11 is a screenshot of an exemplary user interface of a job description being manually reviewed.

FIG. 14 is an exemplary screen shot of a user interface showing a quality manager report.

FIG. 16 is a screen shot of an industry report generated in the reporting module of the system shown in FIG. 1.

DETAILED DESCRIPTION

Figure 1A:
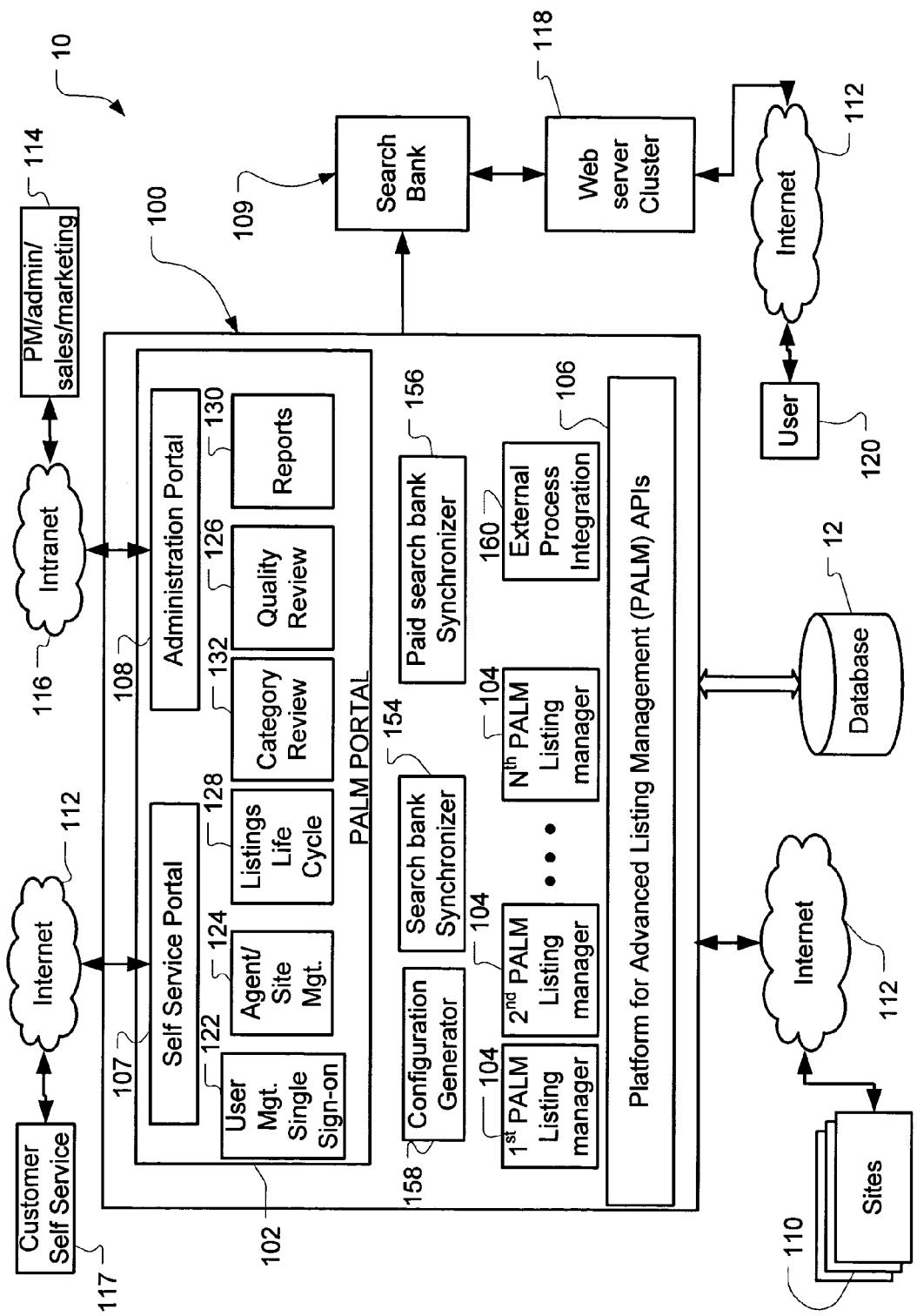
FIG. 1A is an overall block diagram of a listing management platform system in accordance with an embodiment of the present disclosure.

A high level block diagram of an exemplary system 10 utilizing a platform for advanced listing management (PALM) system 100 in accordance with embodiments of the present disclosure is shown in FIG. 1A. The system 10 is a distributed software system designed to obtain listing information data sets from a plurality of sites 110 via the internet 112 or other network access, process the data sets in the PALM system 100, store the processed data sets in one or more databases 12, and then populate one or more search banks 109 for access through a web server cluster 118 by a user 120.

Figure 1B:
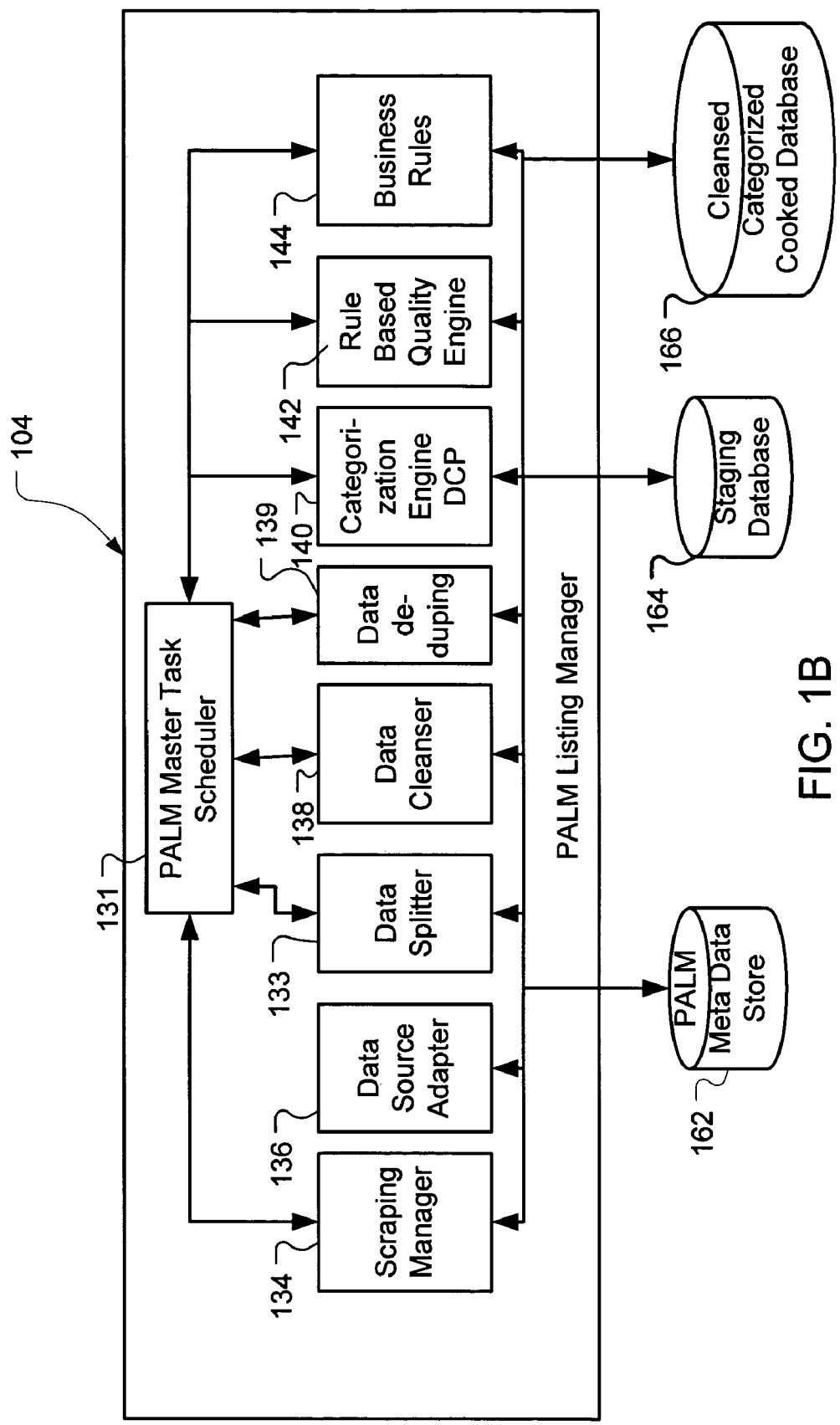
FIG. 1B is an overall functional block diagram of an exemplary listing management module within the management platform system in FIG. 1A.
Figure 1C:
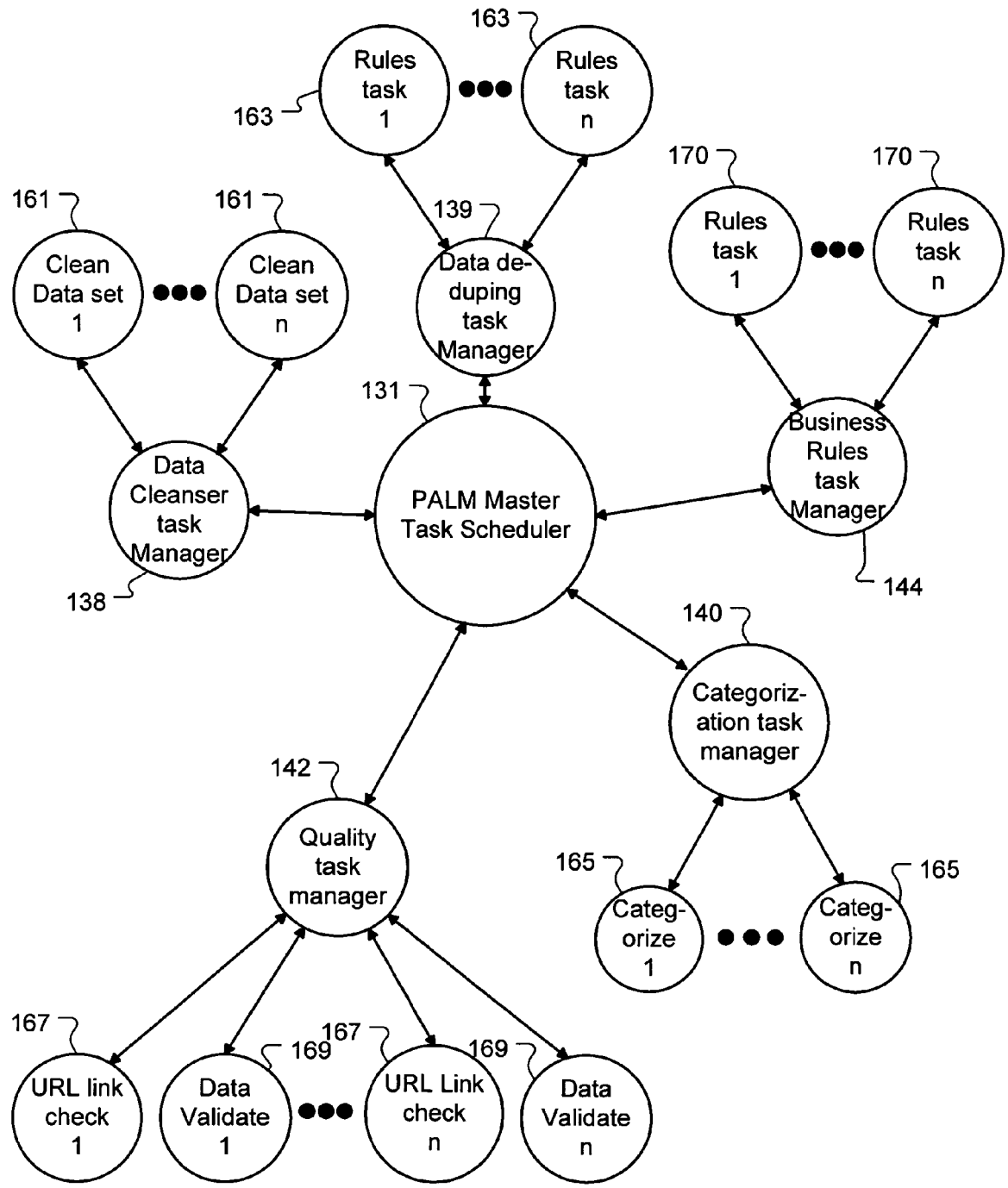
FIG. 1C is an overall functional block diagram of each task manager within the listing management module shown in FIG. 1B.

FIG. 1A shows the exemplary system 10 in a macro view. FIG. 1B is a block diagram of one of the listing manager modules 104 in detail. FIG. 1C is a block diagram of the functionality of a PALM task manager 131 that illustrates the distributed functions within each listing manager module 104.

The PALM platform 100 is a listing lifecycle management platform system that facilitates automation and customization of business processes for content acquisition, classification, quality, performance and display. In an exemplary application embodiment described below in more detail with reference to FIG. 2, the PALM system 100 is utilized in an employment/job search and placement context. However, it should be understood that the system 10 incorporating a PALM system 100 can be utilized to manage any complex listing scheme where a large number of data sets are involved.

Referring back to FIG. 1A, the system 10 generally incorporates all of the potential management functionality of a listings management system into modular form in system 100. Thus the system 100 basically has a portal section 102, a series of listing managers 104, and preferably an external process integration module 160. In addition, the system 100 includes platform Application Programming Interfaces (APIs) 106, a customer self service portal 107, and administration interfacing portal APIs 108. Basically the system 100 interfaces with external input sites 110 and other sources, for example, via the Internet 112. Administrative operational personnel 114 have access to the PALM portal 102 via the administrative portal 108 through an intranet 116. Certain paid customers 117 may also interface through the Internet 112 into the PALM portal 102 through a self service portal 107 if they have been given administrative access to the PALM system 100.

The listing data retrieved from the external sites and sources 110 is processed within the PALM system 100. The PALM system 100 then populates one or more search banks 109. Information in the search banks 109 is then accessed by a web server cluster 118 for display via the Internet 112 upon query by a user 120.

The PALM system 100 permits an administrative operator 114 to accelerate data listings acquisition, processing and availability for display. The PALM system 100 preferably incorporates one or more PALM processing machines or list-ing manager modules 104. The system also interacts through appropriate PALM application programming interfaces (APIs) 108 for external communications, such as, for administrative access, control, examination and reporting functions, and accounting, finance, sales and customer information functions.

The PALM portal 102 includes a number of functional modules that can be utilized to access, control and interrogate processes performed by the PALM listing managers 104 in the PALM system 100.

The User Management, Single Sign-on module 122 provides role based access control for all authorized administrators and supports Create, Review, Update, and Delete (CRUD) use cases for managing user access, permissions and roles, supports standalone authentication or through centralized enterprise authentication (also known as single sign-on) activities and provides approvals and administrator workflows. This module 122 also permits an administrator to perform a single sign-on activity in order to access any functionality for which he is authorized within the PALM portal 102.

Figure 17:
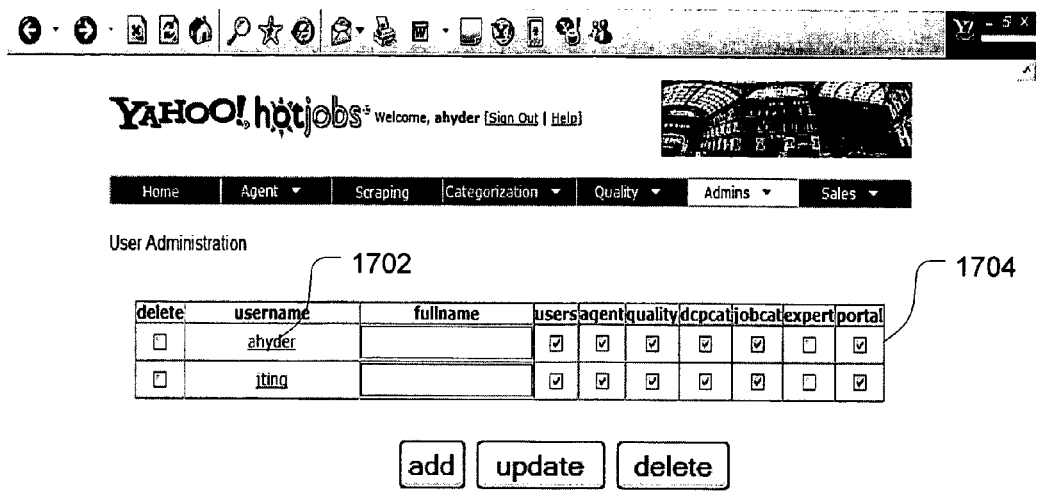
FIG. 17 is a screen shot of a user interface utilized in the User Administration module of FIG. 1A.

An exemplary screen shot of a user management user interface for the user management module is shown in FIG. 17. In FIG. 17, a user administration screen 1700 is shown which lists exemplary permitted usernames 1702 and their access permissions 1704 that shows that hey are administratively authorized to perform or edit functions within the PALM system 100. A user interface screen for a self service customer 117 entering through the self service portal 107 would be much more limited as such a customer would preferably have only limited functional access within the system 100.

The Agent/Site Management module 124 controls the operation of scraping engines discussed in further detail below with respect to a particular embodiment involving the management of job information obtained by scraping. This module 124 supports CRUD use cases for managing sites and site attributes, such as usernames and passwords needed for an Agent to automatically access remote sites. This module also enables, disables, approves and denies requests for agents/sites. These site attributes include:

Seed URL(s)
Throttle speed
Frequency
Preferred Day/Time of scraping
Display/Non-display schedules
Agent instructions for staying within a given list of "hosts"
Blacklist sites (those that are not to be scraped)
Stay within a given SLD e.g. <anything>.ibm.com
Crawling up to one host away (e.g. www.ibm.com has a link to www.ibm.peopleclick.com, then get all listings from peopleclick.com)

The Quality Review module 126 provides a manual tool that permits an operator to review listing quality, review content issues and errors, and validate or invalidate listings. For example, the validation operations may include invalidations for test, junk, and offending content listings. Finally, the quality review module 126 provides a detailed manual review mechanism for the automated quality review task described below with reference to FIG. 13. In essence, the quality review module permits an operator to retrieve data sets from the database that have been flagged as not meeting predetermined quality criteria.

The Listing Lifecycle module 128 permits fine tuning, and adjustment of throughput options and performance of the PALM system in operational control of listing data input and output. For example, this module can backfill listings by Countries, demographics (DMAs), Verticals, Quality or other parameters. For example, in a region of the country where there are few paid listed agricultural jobs, the displayed results to a User 120 supplemented, i.e. backfilled, with scraped listings from such areas, or may be populated with listings that would otherwise be excluded based on a quality level determination. Thus, this module can be used to adjust a blending throttle between scraped display information, and paid display information, change the percentage of scraped and paid listings by various parameters such as Country, DMAs or verticals. It includes a functionality for comparing statistics and performance of paid, scraped and premium listings. It provides CRUD use cases for managing listing types and attributes, and manages content/listings display and expirations schedules.

The Reporting module 130 supports a number of reporting tasks by industry and demographics, among other criteria. For example, this module 130 permits comparison of historical performance of paid and scraped listings, facilitates tracking of listing click throughs and expressions of interest for paid and scraped listings, and tracks traffic redirection. It also tracks the number of new listings, number of paid and scraped information data sets. Finally, sales and marketing teams can use this tool to up-sell premium listings based on prior history of similar such listings. An exemplary screen shot of an industry report 1600 is shown in FIG. 16. An exemplary quality manager report 1400 is shown in FIG. 14.

The Category Review module 132 provides a mechanism wherein listing information that could not be automatically catalogued or classified in an appropriate category can be manually reviewed and either properly categorized or deleted. The category review module 132 is explained in more detail below with reference to one particular implemented embodiment of the PALM 100 system in the field of job search and listing information management. However, the category review principles described below are applicable to any system in which data listings are systematically obtained, reviewed and categorized in accordance with predetermined and dynamically determined criteria. Exemplary automatic categorization techniques, developed and assigned to the assignee of the present disclosure, are described in U.S. patent application Ser. No. 10/920,588 filed Aug. 17, 2004 and entitled Automatic Product Categorization.

Search bank synchronizer module 154 takes cleansed and categorized data sets from the database 12, formats it properly, and then populates a copy to an appropriate one of the search banks 109. Similarly, paid search bank synchronizer 156 takes cleansed and categorized data sets originating from paying listing customers, formats the data sets properly for search, and populates the search bank 109 with a copy to be available for searching. Such paid listings are preferably given a higher level of visibility to a user 120 when the data set meets a user's search criteria and thus is displayed to the end user 120.

The configuration generator module 158 analyzes the volume of data being handled by the system 100 and generates the configuration parameters for each of the available PALM listing manager modules 104, as well as determining the number and size of the PALM task manager/schedulers to be allocated to each PALM listing manager module 104. Based on listing manager module availability, volume of data being sent into the system 100, the results of scraping operations, as further described below, and administrative input, an administrative operator tells the configuration manager module 158 the information necessary to optimize and levelize data throughput in the system 100.

The PALM system 100 includes a number of from 1 to n PALM listing manager modules 104 as determined by hardware availability and the configuration manager module 158.

An exemplary one of the PALM listing managers is shown in FIG. 1B. The PALM listing manager modules 104 have access to and utilize data in the overall PALM system 100 database 12, which includes PALM metadata store 162, staging database 164, and cooked database 166, along with local databases associated with each input into the PALM system 100. Generally, administrative information is relegated to the metadata store 162. The staging database 164 is a temporary database used during initial data processing. Once the initial processing has been completed, the processed data is stored in the cooked database 166.

Each listing manager module 104 preferably includes a master task scheduler 131 that manages and schedules a series of tasks that must be performed on each data set that comes into the system 100 from external sources such as sites 110 and the customer self service block 117. The tasks controlled by the master task scheduler 131 include, but are not limited to, a Scraping Manager module 134, a Data Source Adapter task 136, a data splitter task 133, a Data Cleanser task 138, a Data De-duping task 139, an Automatic Categorization Engine task 140, a Rule Based Quality Engine task 142, and a Business Rules task 144.

The Scraping Manager module 134 has overall control and management of tools that scrape, or obtain listing information from external sites 110. There are two general types of scraping tools utilized: a site specific scraping tool such as Kelkoo, originally developed by Kelkoo, Inc. now a subsidiary of Yahoo, Inc., and a URL crawler engine such as Café/Kelsa scraping engine, also developed by Yahoo, Inc. The crawler engine starts with a seed URL and ferrets through each and every link it encounters, and thus may lead to locations and information far removed from the original address. The scraping manager module 134 coordinates operation of these scraping tools with the agent/site management module 124, through the master task scheduler 131, to ensure that sites scraped and crawled are not overwhelmed with activity, but are frequently visited to ensure current listing information is handled.

The Data Source Adapter task module 136 takes data from different data sources, stored in the local databases as data sets are received from various inputs into the system 100 and converts the data sets of different types into normalized data sets all of one, normalized type. For example, data sets may be fed into the system 100 as text file, XML, HTML, or RSS data feeds. These different types of data sets must be normalized before further processing. The Data Source Adapter task module 136 ensures that all data sets are of a common normalized type.

Referring now to FIG. 1C, each PALM master task scheduler 131 schedules and controls a series of tasks, some of which manage multiple task threads. The master task scheduler 131 schedules the data cleanser task manager 138, the data de-duping task manager 139, the categorization task manager 140, the quality engine task manager 142, and the business rules task manager 144, each of which may manage n threads of tasks.

The Data Splitter task 133 divides chunks of data sets into different groupings of roughly similar character so that data sets having similar attributes will be processed by the same task sequence threads. This task 133 determines the assignment of data sets to different threads. The data split task first detects if there is a configuration change in the number of available PALM master task schedulers 131. If there is a change, the staged data from the scraping farms and other sources is rehashed into new groupings. If there has been no change, then only the newly added data sets are evaluated. The data split task 133 splits listing data based on a hash of the ASCII of predetermined fields, such as a job title, company and job state, in the case of a job listing. This hash specifically is ((ascii(jobtitle)+ascii(jobcompany)+ascii(jobstate1))% NUM_CK_RUNNERS) where NUM_CK_RUNNERS is the number of threads available to the PALM master task scheduler 131 as determined by the configuration manager 158. The function of the data split task is to use a uniform hash function that will always split the same data sets into the same "bucket" such that the same data records, preferably get processed by the same thread.

The Data Cleanser task manager 138 controls examination of each data set or record in a thread 161 and removal of formatting such that the listing information in each scraped listing has the same format and content structure. Specifically, this task 138 controls stripping all HTML tags from the data fields, validating names and puts in appropriate codes such as a 2 letter state code for domestic US listings in addresses and location data. For international listings, it puts in the appropriate international location abbreviation (provinces/territories). Each of the threads 161 in this task module 138 also performs operational checks of such fields in the data listings such as each URL to ensure that it starts with either "http:" or "https:" and strips profanity words, validates date fields, checks for invalid characters in each field, e.g. all numbers in a city field. Finally, each thread 161 preferably provides correct basic punctuation operations, e.g. ensuring that the first letter in a sentence is capitalized, and two spaces to start each new sentence.

The Data De-duping task manager 139 manages and schedules multi-threaded tasks 163 of taking the data record or listing data set from the data cleanser manager module 138 and comparing the data set to records in existing databases 164 and 166 to ensure that the PALM system 100 is not duplicating data already received, examined and stored. Any data sets that, when compared to existing database content are flagged as duplicates, and are removed from the database 12. Hence the term "de-duplicating" or "de-duping."

The Categorization task manager module 140 manages threads 165 that automatically perform operations to determine categories that a particular listing data set may belong to. For example, a home for sale listing in Mobile Alabama might be categorized according to its location, size, form, whether single family or duplex, etc. A job data set may be categorized by field, hours, education, location, etc. Thus the categorization engine task manager 140 controls and manages the operations necessary to automatically categorize the subject listing data sets according to predetermined categories. This task manager 140 is multi threaded and coordinates up to n instances 165 of category determination concurrently. This categorization task preferably also includes determination of confidence levels for the categorization determined. Exemplary categorization techniques are disclosed in U.S. patent application Ser. No. 10/920,588, filed Aug. 17, 2004 and the related applications described therein, all of which are assigned to Yahoo, Inc.

The Rule Based Quality Engine task manager module 142 provides a sequence of rules to which each listing data set is scrutinized by to ensure that the data set meets certain criteria and contains certain minimum levels of detailed information. Such criteria may include, for example, a street address for a home real estate listing, or a job title for a job listing or a city location for either such implementation. One exemplary embodiment of this module 142 is explained in further detail below in reference to job search implementation of the system 100. The quality engine task manager 142 schedules two basic thread sequences: a URL link check thread 167 followed by a data validation thread 169. These checks 167 and 169 verify that the URL is in fact a currently valid URL and also perform a word matching routine between database record words and a web page downloaded from the URL to ensure that the listing descriptions match. The Data validation thread 169 randomly selects words from the data set and matches them to the downloaded web page and preferably chooses words that have greater than 5 characters in them. If the data set does not match the downloaded web page, an error flag is set. A more detailed example of this task is explained below with reference to a job searching implementation of the PALM system 100 with reference to FIG. 13 below.

The Business Rules Task module 144 provides businesses the ability to apply discrimination rules to display or not display listings, filter the listings, show partial listings based on industry location, or to completely block the site's data for display even though the data may have been crawled previously. For example, in a job seeking application, for the Boston area, one may select display of only 10% of the scraped or crawled data for the health industry during a predetermined time period. When a fresh listing arrives, the business rules engine goes through the entire data set and may weed out or mark all listings accordingly to the predefined rules.

From the above description of the PALM system 100, it should be clear that the system is scalable, multi-threaded and distributive such that the functionality of the modules, such as the plurality of modules 104, may be carried out on different combinations of computing machines suitably operatively connected together so as to perform the described functions.

Figure 2:
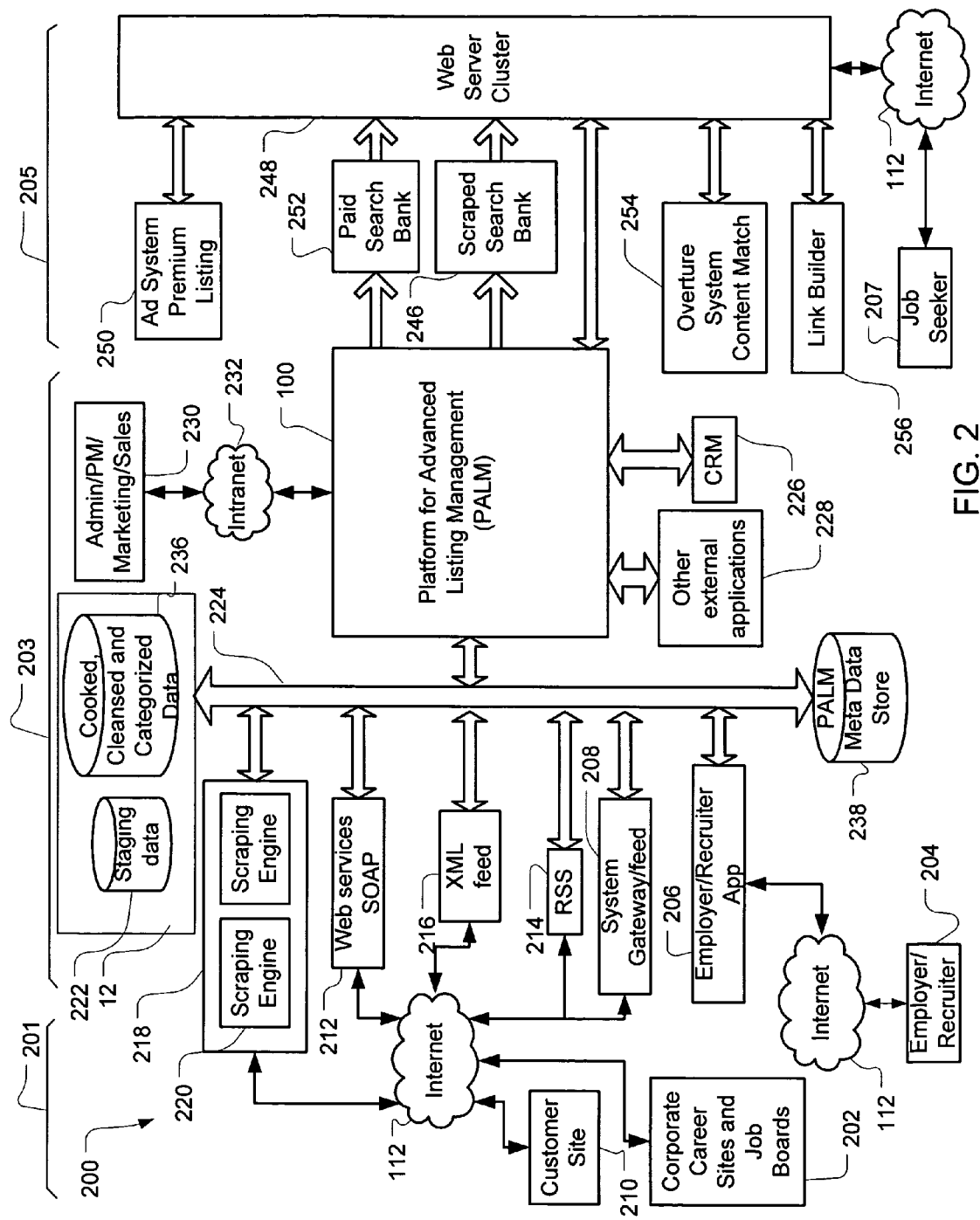
FIG. 2 is an overall block diagram of a job search system utilizing an embodiment of the management platform system shown in FIG. 1A-1C.

An overall architecture diagram of a job search system 200 incorporating one embodiment of a PALM system 100 shown in FIGS. 1A-1C in accordance with an embodiment of this disclosure is shown in FIG. 2. The system 200 can be thought of as having three sections: an external input section 201, a data handling section 203, and an output handling section 205. Basically the data handling section reaches to the external input section 201 for job data, processes the data, organizes and verifies validity of the data, categorizes the job data, and provides the data to the output section which may be accessed eventually by a job seeker 207 via the Internet 112.

The external input section 201 includes the job postings that may be accessed by the data handling section from such sources as corporate and company career sites and a number of other job boards 202. These corporate career sites and job boards 202 currently consist of several thousand company career sites. An employer/recruiter 204 can also directly provide job listing information through the Internet 112 to an employer/recruiter interface application 206. Such recruiter interface application provide to the employer/recruiter a user interface screen to input job information and submit an individual listing in the proper format to the data handling section 203.

A system gateway/feed 208 can communicate with a customer site 210 and pull in job information in a predefined format that the customer site 210 has previously stored for this purpose. The gateway/feed 208 permits a customer site to submit information and provides a system feed into the data handling section 203 of the system 200. Alternatively, a customer site may make job information available through web services 212. Here, the system 200 accesses the customer site 210 via Simple Object Access Protocol (SOAP) to obtain job listing information. Another way job information is obtained from a customer site is through RSS 214. RSS, an abbreviation of "Really simple Syndication", is a lightweight XML format designed for sharing news, blogs, product data, and many other types of web content. RSS has evolved into a popular means of sharing content between sites including the BBC, Yahoo, CNET, CNN, Disney, Forbes, Motley Fool, Wired, Red Herring, and many more. Job information may also be obtained from a customer site 210 through a direct XML feed 216 via the internet 112.

Also providing input to the data handling section 203 is a scraping engine farm 218. The scraping engine farm 218 has several scraping engines 220 that typically use different scraping technologies and methodologies which may be developed as a matter of design choice but are preferably specifically directed in a preferred embodiment herein for searching over a global electronic network such as the Internet 112, with each engine 220 being optimized for either a particular type of scraping task or particular type or set of corporate sites. For example, the Kelkoo scraping engine, developed by Kelkoo, Inc. in Europe, now a subsidiary of Yahoo, Inc., is optimized to thoroughly scour a predetermined known corporate site or listing site. The Kelkoo scraping engine is optimized to follow internal links within the site to specific internal locations to extract job information data sets. However, it does not follow external links. The Café/Kelsa Scraping engine farm, developed by Yahoo, Inc., and described in U.S. patent application Ser. No. 11/064,278, filed Feb. 22, 2005 and entitled Techniques for Crawling Dynamic Web Content, is optimized to systematically examine a seed URL and follow every link within the site and follow every internal and external link that may be provided on that URL as well as links it finds on its "crawl."

The input section 201 feeds data from these various sources and feeds to a staging database 222 that is part of the overall database 12 via a bus 224. The staging database 222 is then accessed in the data handling section 203 by the platform for advanced listing management (PALM) system 100. The PALM system 100 also has several modules that provide input into the management system 100. For example, a customer relationship manager (CRM) module 226 and an other external application module 228 may provide information and extract reports and other information that are uniquely available within the PALM system 100. Project management, operations, sales and marketing personnel 230 can also provide input to and control for the PALM system 100 via an intranet 232 as will be described in more detail below.

The data output section 205 comprises the job search web server/client cluster 248 and a number of data source modules to this cluster 248. The scraped search bank 246 is one of these. An ad system premium listing module 250, a paid search bank 252, an overture system content match module 254 and a link builder module 256 are queried by the job search web server/client cluster 248.

The ad system premium listing module 250 organizes and provides the cluster 248 with advertisements from specific employers or recruiters that have a paid premium account with the host of the system 200. These premium advertisements may be displayed to the job seeker in a special box, bannered, highlighted, or otherwise set off from the other listings that may be presented to a job seeker 207 in response to a particular search request.

The paid search bank module 252 is a special search bank for which an employer member 260 may access upon a fee payment to the host of the system 200. This paid search bank module 252 identifies, stores, and tracks job listings from those job recruiter employer or corporations who pay a fee to ensure that their posted job listings receive a higher or emphasized placement on a user interface presented to the job seeker 207. Thus the paid postings are provided directly into the search bank 252 by the member company via a member desktop 262 or gateway 264. Paid search bank 252 contains information provided by job listing entities that have paid a premium to the operator of the system 200 described herein to push listings in connection with certain desired search categories provided by a user, so that such search results are provided in a prominent position to the user via the user interface 406 in exchange for a premium payment.

The Overture system content match module 254 queries whether there are any advertisements in its database that match the job searcher's search criteria. These advertisements are previously stored in or linked to a paid database for use by the host of the system 200. Examples of such advertisements are shown in the search results user interface screen shot shown in FIG. 4.

The link builder module 256 provides linkage cookies and addresses to link to other sources of jobs that match the search terms provided by the job seeker 207. In some instances, in order for a job description to be viewed, the job seeker must be passed to a particular website to see the listing. In such circumstances the site might require a particular security element such as a cookie, etc. before the job information may be viewed. Accordingly, link builder module 256 provides the necessary interface characteristics in the case where a site needs a particular cookie or other identifier. The link builder module 256 manages the process to build a URL which includes the necessary information required by the site such as for example, a session cookie to access the job listing. The result of the link builder module 256 may be provided to the job seeker 207 in addition to the particular jobs of interest from his/her search request.

Figure 3:
FIG. 3 is an exemplary user (job seeker) search input query interface for use in an embodiment of an exemplary system shown in FIG. 2.
Figure 4:
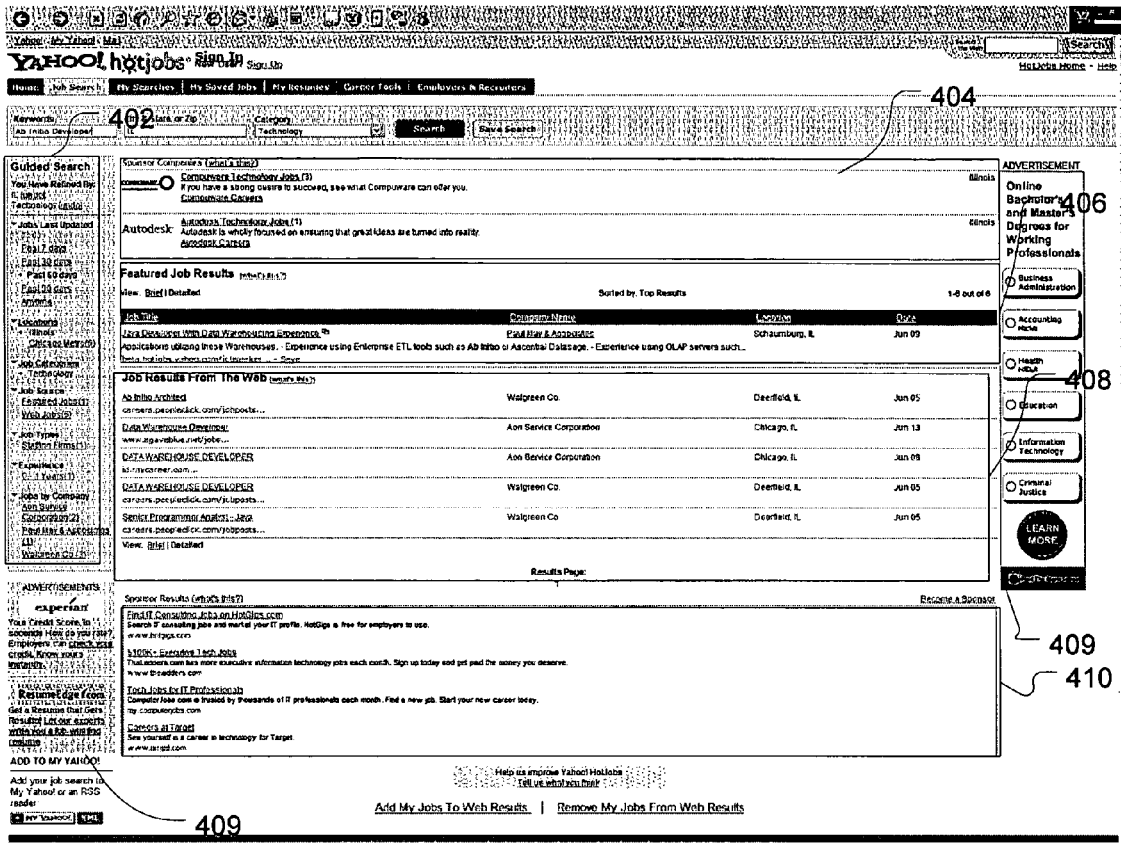
FIG. 4 is an exemplary user (job seeker) search results interface for use in an embodiment of the exemplary system shown in FIG. 2.

With continued reference to FIG. 4, the web server cluster 248 acts as a gateway interface to a job seeker 207 seeking to utilize the system 200 described herein. The job seeker 207, in order to initiate a search request on the system 200, is preferably presented with a user interface similar to that shown in FIG. 3. The cluster 248 then searches to obtain information from the system search banks 252, 254, 246 and 250 and presents it in an easy to use and efficient manner to the querying job seeker 207 such as in the exemplary results interface shown in FIG. 4.

A job seeker 207 entering a search request 302 into a user interface 300 such as that depicted in FIG. 3 interfaces with the server cluster 248, which in turn presents an aggregated result to the job seeker 207 as shown in FIG. 4. Thus the user would see, as described below, premium listings through the provision of listings identified by the ad system premium listing module 250, job search bank 252, the banks 254, 250, 246 and crawled jobs from bank 256.

Turning now to FIG. 4, an exemplary screen shot of a user query result interface 400 is shown. This user interface 400 gives the job seeker an opportunity to review all of the job information that match his query. In addition, it permits the job seeker to submit a different or more refined query. Display portion 402 gives the user an opportunity to review all of the job information that would match a particular search criteria, for example, in FIG. 4, a software developer position in Illinois. The job seeker may review all of the job information available as a result of the search for software developer positions, or may review only those descriptions that have been updated in the past 24 hours, 7 days, or other preselected time period. Also the job seeker may structure his or her search by experience level, location, or other characteristic or subcategories within a job description.

The interface 400 also displays result segments separated by multiple preferable result groupings. Thus the system 200 may present a segment for premium listings 404 obtained from ad system premium listing module 250, which permits the host of the system 200 to utilize the system 200 as a revenue enhancing tool by providing the opportunity for business seeking employers to pay premium to have their job listings obtain a more prominent position in the result portion of the user interface 400 presented to the job seeker 207.

The user interface 400 also preferably includes a second subsection 406 which presents results of the search from the paid job search bank 252. A third subsection 408 presents non-premium algorithmic search results which is a direct result of searching the scraped search bank 246. A fourth section 410 provides more general paid links from the overture system content match module 254. Finally, a number of advertisements 409 may be displayed from a search of the ad system premium listing module 250.

Figure 15:
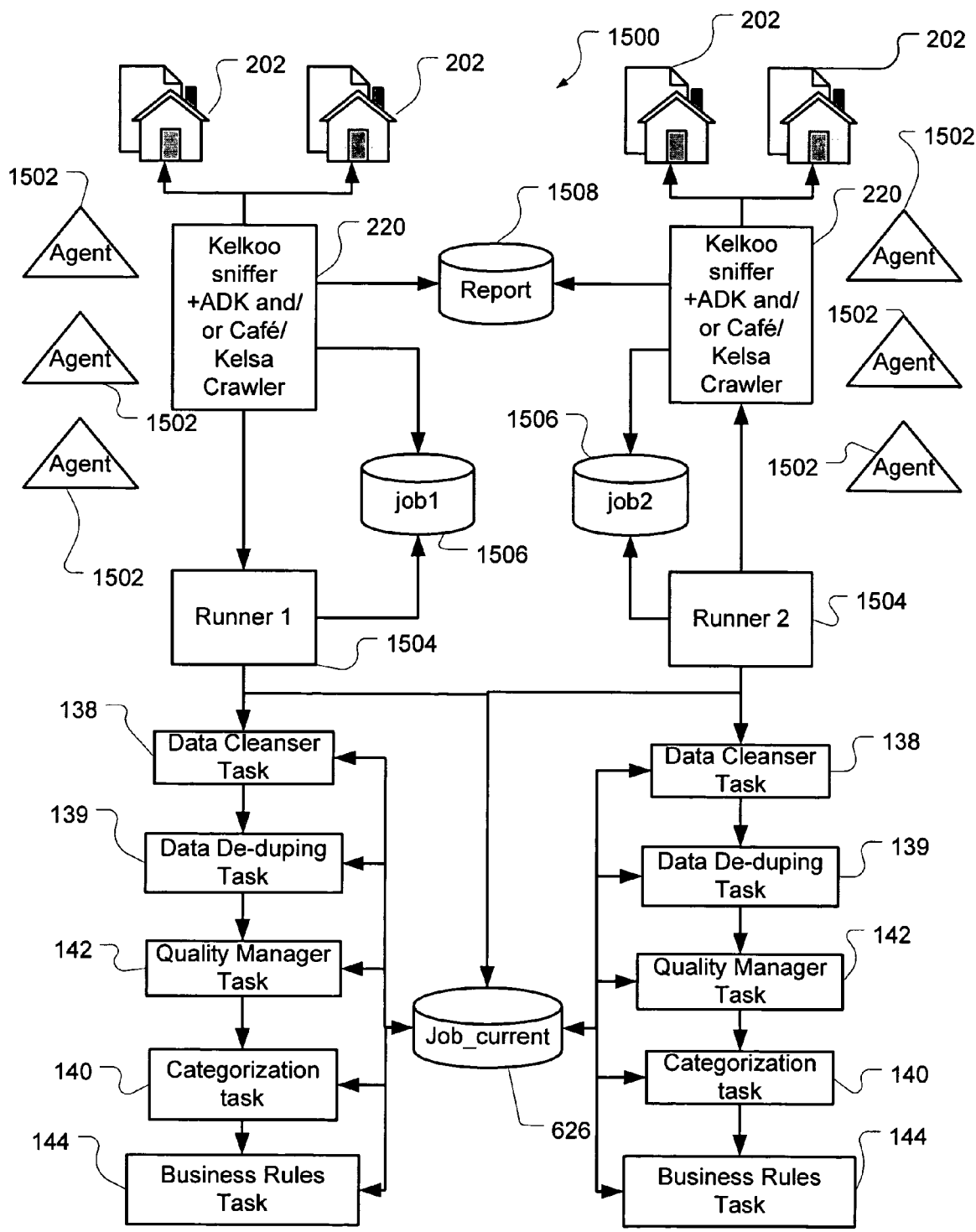
FIG. 15 is a functional diagram of scraping in accordance with an embodiment of the present disclosure.

Scraping involves the following components shown in FIG. 15: the Kelkoo Sniffer 220, a series of Agents 1502 to scrape web sites 202 for jobs, preferably a MySQL database such as staging database 222 to store the scraped jobs and agent logs, and Runner script 1504 managed by the Agent/Site management module 124 in the PALM system 100 to launch the agents 1502.

The following is a summary of how data flows preferably through the scraping farm 220 in the system 200. At the beginning of the scraping cycle the "job_current" table 626 in the cooked database 236, another portion of the overall database 12, is truncated and its contents is copied to an archive table (not shown). Archives of scraped jobs are preferably stored for a limited period only (e.g. 7 days).

The Kelkoo "Sniffer" in the scraping engine 220 is a Java program that is used to launch adapters (a.k.a. agents 1502). The scraping engines 220 scrape the job boards 202, via the Agents 1502. Each agent 1502 preferably consists of three text files: agent.info, agent.props, and agent.sql. A single agent is used to scrape a single web site. The agent files are stored in an agent specific directory. Then the Agents 1502 dump the scraped jobs into a "job" table (note that there can be several job tables) 1506, two of which are shown in FIG. 15. The Runners 1504 copy the job records from the "job" table(s) 1506 to the "job_current" table 626. Components downstream from the runner 1504, such as the Quality Manager module 142 and the Categorizer modules 132 and 140 receive copies of the job records and perform quality management and categorization operations on the records in the job_current table 626, which is preferably part of the cooked database 236. The results are then passed to the cooked database 236 shown in FIG. 2.

The Kelkoo Sniffer search engine 220 thinks about agents 1502 as virtual SQL tables. The schema of the virtual table is defined in the agent's sql file. The info file is a SELECT statement against the virtual table that the Sniffer search engine 220 runs. The props file contains the scraping logic that is used to fill the virtual table. The scraping logic is a sequence of steps that are carried out by various filters. Filters are Java classes that make up the Adapter Development Kit (ADK). Filters are executed sequentially and can read and write variables to a common context. There are filters to: find a string or a pattern in an html page and save it, manipulate variables of the context, loop over a re-occurring pattern and execute other filters in a loop, go to a page identified by a URL and retrieve its content, etc.

The output of an agent 1502 is a text file that contains SQL INSERT statements for each scraped job. The Sniffer search engine 220 uses this data file to load the scraped job records into a MySQL table, called "job" (the actual table name is a configuration parameter) 1506. The Sniffer 220 is configured via various command line parameters and an arbitrary number of property files that are passed in on the command line. The most important configuration parameters of the Sniffer search engine 220 are: Name of the MySQL database, database user and password, name of the table to dump the scraped records to; and the Path to the agent request files and the directory that contains the agents 1502.

The Sniffer search engine 220 is preferably single threaded: it loads and runs one agent 1502 at a time. After running an agent 1502 the Sniffer search engine 220 inserts a record to the "report" table 1508 with information about: the time of the run, the name and path of the agent 1502, the number of scraped records (jobs), and possible errors.

The agent files are stored in a CVS repository. The version of the agent 1502 that has passed QA is tagged with a special CVS tag. This scheme allows agent developers, testers and the production system to work on the same tree, yet to avoid running un-tested agents in production.

The agent runner 1504 is a Perl script that is developed for the system 200. The Runner 1504 requires that the agent files be available on the local file system. Before the Runner 1504 is started the local CVS tree is synced to the production tag to download all the agent files that should be run. The runner 1504 performs the following steps:

1. It reads its configuration file. This contains the list of agents 1502 to run. Each Runner has an id that is passed in as part of the configuration.
2. It generates configuration files for the Sniffer 220 based on its own configuration.
3. It deletes all the records from the job_current table 626 that belong to the agents 1502 to be run (this in most cases is unnecessary, since preferably the job_current table 626 is truncated every day).
4. It launches the Sniffer search engine 220 that runs the agents 1502.
5. It preferably processes each record in the job table to strip the job description from html tags. Each Runner has its "own" job table 1506 whose name is generated using the runner's id (e.g. "job1").
6. It dumps all the records from the job table 1506 to the job_current table 626. The job records contain the id of the Runner, which helps downstream components to easily identify records that came from a particular Runner 1504.
7. It writes a summary of the agents run to its log file. This information is retrieved via queries to the job, job_current and the report tables 1506, 626 and 1508 respectively.
8. Finally, it invokes the Quality Manager management module 124 via ssh, so it can execute on a separate machine. The id of the of the Runner 1504 is passed to each of the Data Cleanser task 138, the Data De-duping task 139, the Quality Manager task 142, the categorization task 140 so each task knows which records to process from the job_current table 626 when called upon to do so by the Master task scheduler 131.

The PALM system 100 controls and manages throughput from the input section 201 to the output section 205. Preferably once a day, or at some other predetermined interval, the one or more PALM listing managers 104 are instructed to access data in the staging database 222, process that data, and update the search banks 246 and 252 in the output section 205. Since there may be a tremendous amount of data to be processed, the PALM system 100 typically involves a number of PALM listing managers 104, each operating on data from the staging database 222 relatively independently.

The system 100 can incorporate a number of PALM listing manager modules 104, all essentially operating independently and in parallel, each working on data first designated in the data split task to that particular manager's runner number. The PALM listing managers 104 receive configuration information from the configuration generator 158. The configuration generator 158 designates runner numbers to the available PALM listing managers 104 in the system 200.

Figure 18:
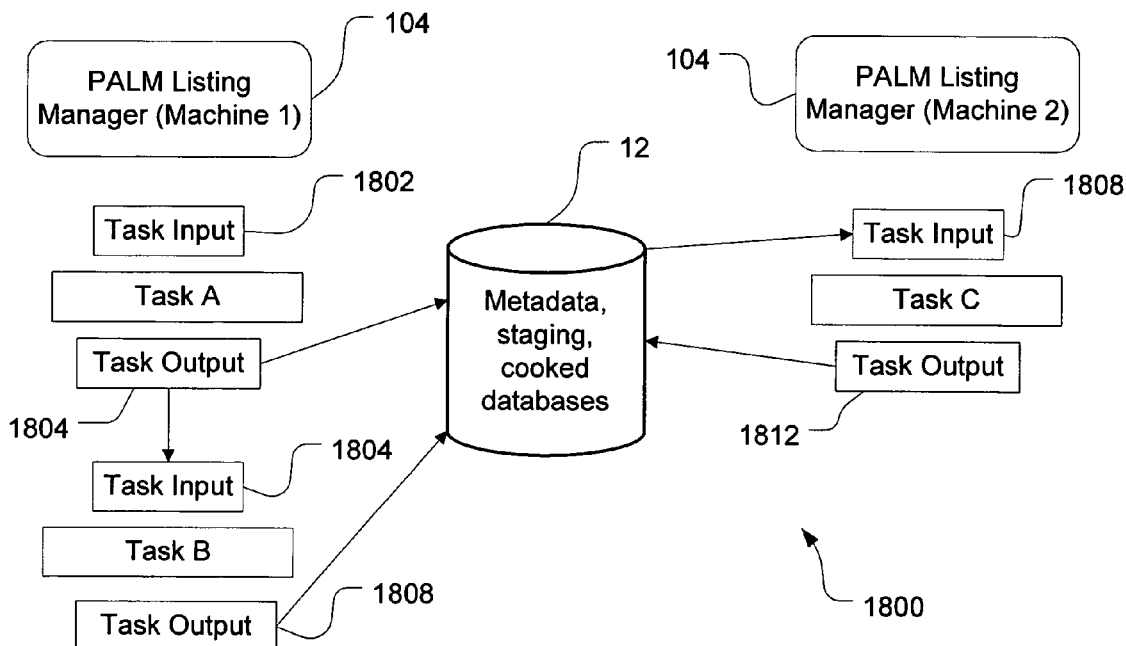
FIG. 18 is a diagram of task manager sharing of data between two task managers in the system shown in FIG. 2.

Each PALM listing manager 104 receives metadata from, and stores metadata to the PALM metadata database 238, which is preferably a part of the overall distributed database 12. This database 12 is preferably shared as illustrated in FIG. 18. For example, the PALM listing manager 104 of machine 1 takes input 1802 from, for example, the staging database 222, performs Task A, and generates task output 1804. This Task A output 1804, for example, is then input 1804 to Task B. At the same time, this Task A output 1804 may be temporarily stored in the staging database 222. The output 1808 of Task B is also temporarily stored in the staging database 222 or metadata database 238, as appropriate, for use by one of the other PALM listing managers 104, in this example Machine 2. Machine 2 pulls its needed input 1808, if not available in the staging database 222, from the metadata database 238 as needed to perform Task C. The output 1812 of task C can similarly be stored back in the database 222 or 238 for use of another listing manager's task. By utilizing this scheme to temporarily image data, the several operating PALM listing managers 104 do not necessarily need to wait in line for the other listing managers 104 to complete their tasks. In this way, overall processing throughput is enhanced.

Each PALM listing manager 104 in the PALM system 100 in the system 200 has a master task scheduler 131 that controls a stack of tasks to operate on the data that is scraped from various sites accessed through the Internet 112, as well as job information data sets obtained from customer sites 210 and other sources through the RSS feed 214, the XML feed 216, the web services SOAP 212, and/or the Employer/Recruiter Application 206. In the embodiment shown in FIG. 2, concerning employment listings and job searching applications, each of these listing data sets, no matter from where obtained, are initially stored in the staging database 222. The PALM system 100 operates on the data in the staging database 222 and passes it to a cooked, cleansed and categorized database 236, using an intermediate PALM Meta Data store 238. Once the job listing data sets are cooked, the data sets are passed to the output section 205, specifically populating search banks 246 and 252.

Figure 5:
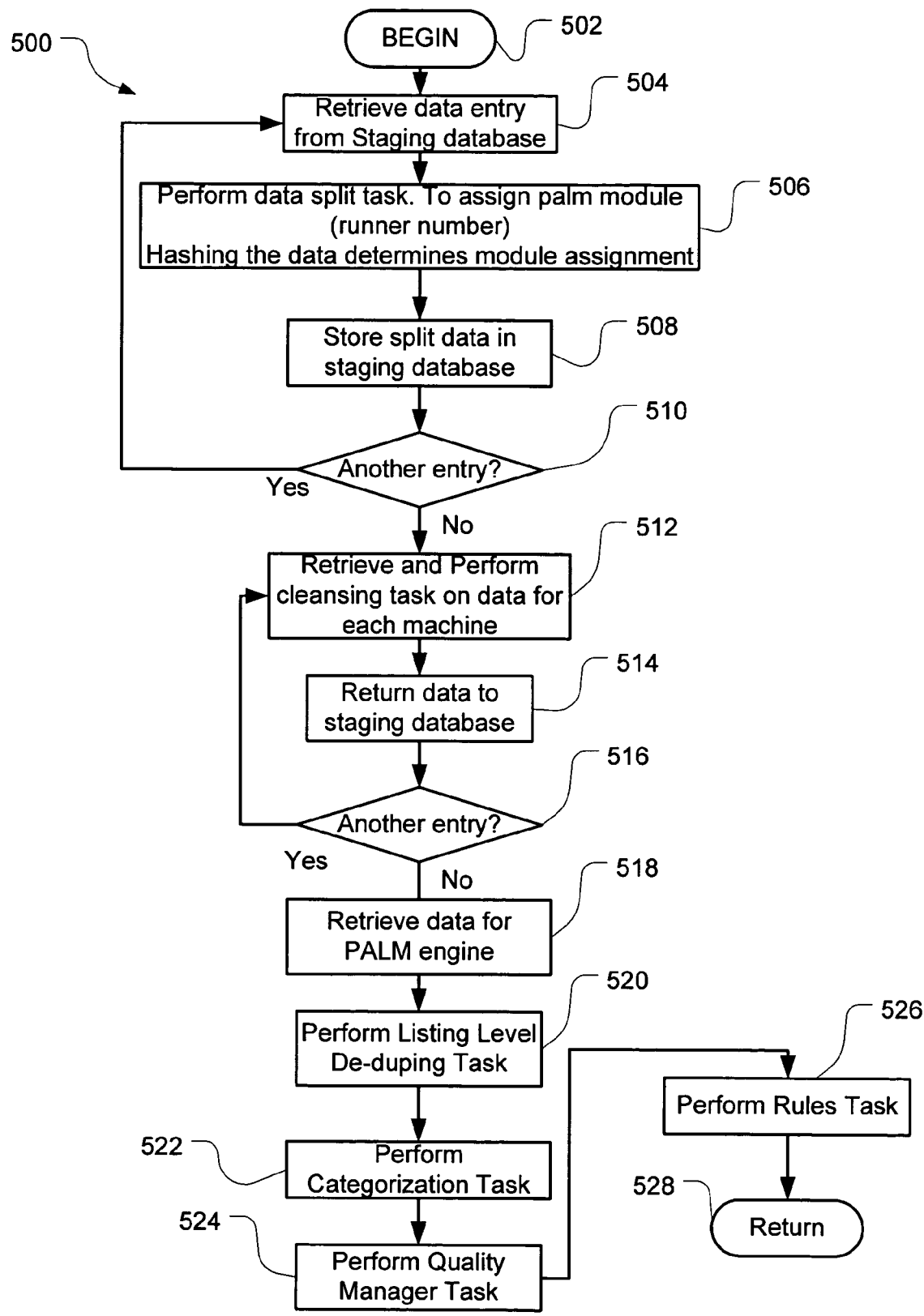
FIG. 5 is a simplified data process flow through system shown in FIG. 2.

Basic process flow operations within each of n PALM listing managers 104, each controlled by a PALM master task scheduler 131, are shown in FIG. 5. Operational flow begins in initialization operation 502 where the PALM system 100 begins its processing cycle in accordance with a predetermined schedule. First, the PALM system 100 determines which listing manager 104 will handle what tasks.

Once a particular PALM listing manager 104 is designated by the configuration manager 158 to handle a chunk or batch of data sets, the PALM master task scheduler 131 controls operations 504 through 510. Then each respective individual task manager 138, 139, 140, 142, and 144 will process data sets in parallel threads in the staging database 222 as described below with reference to operations 512-528.

Control transfers to operation 504 to begin allocation of data sets within the staging database 222 to the available PALM task threads. This is a Data Split Task which is managed and performed in the Data Splitter task module 133. The output data of the Data Split Task 133 is returned to the staging database in operation 508 along with a runner number of the corresponding PALM Task thread to which it is assigned.

The data split task 133 first detects if there is a configuration change in the number of available PALM task threads 1-n as determined by the configuration generator 158. If there is a change, the staged data from the scraping farms and other sources is rehashed into new groupings. If there has been no change, then only the newly added data sets are evaluated. The data split task splits listing data sets based on a hash of the ASCII of the job title, company and job state fields. This hash specifically is ((ascii(jobtitle)+ascii(jobcompany)+ascii(jobstate1))% NUM_CK_RUNNERS) where NUM_CK_RUNNERS is the number of PALM threads available as determined by the configuration generator 158. The function of the data split task is to use a uniform hash function that will always split the same jobs into the same "bucket" such that the same data records, e.g. job listings, get processed by the same threads.

Control then transfers to query operation 510. In query operation 510, the query is made whether there is another entry in the staging database 222 that does not have a PALM task thread assigned to it. If the answer is yes, control transfers back to operation 504 where the next listing data set is retrieved from the Staging database and examined. If the answer is no, then there are no more data sets to be split, and control transfers to operation 512.

Operations 512 through 528 are preferably performed by each of the PALM task managers preferably in parallel, on each data set having a runner ID corresponding to the thread to which it is assigned in the particular PALM task manager 104.

In operation 512, the master task scheduler 131 pulls the first staging database entry with its runner ID number and performs a data cleansing task managed by data cleanser task manager 138. The data cleansing task manager 138 thread pulls the complete data record from the staging database 222, and removes all formatting such that each job listing data set is in the same format and content structure. Specifically, the task strips all HTML tags from the data fields, validates the United States state names and puts in a 2 letter state code. For international listings, it puts in the appropriate international location abbreviation (provinces/territories). The cleansing task thread checks the URL to ensure that it starts with either "http:" or "https:". Next, this task strips all profanity words, validates date fields, checks for invalid characters in each field, e.g. all numbers in a city field. This task also checks for a maximum number of words in a field. For example, a city name cannot have 15 words in it. It also puts country names in 3-letter country code formats, corrects spelling in fields such as the jobtitle, description. Finally, it provides correct basic punctuation, e.g. first letter in a sentence is capitalized, and two spaces to start each new sentence.

Once the Data Cleansing Task thread has been performed on a job listing data set in a thread, the listing is returned to the staging database 222 in operation 514. Control then transfers to query operation 516. In query operation 516, the question is asked whether there is another data set with that PALM master task scheduler 131's runner ID. If so, control passes back to operation 512 and the next data set is retrieved and cleansed. If not, control transfers to operation 518.

Figure 12:
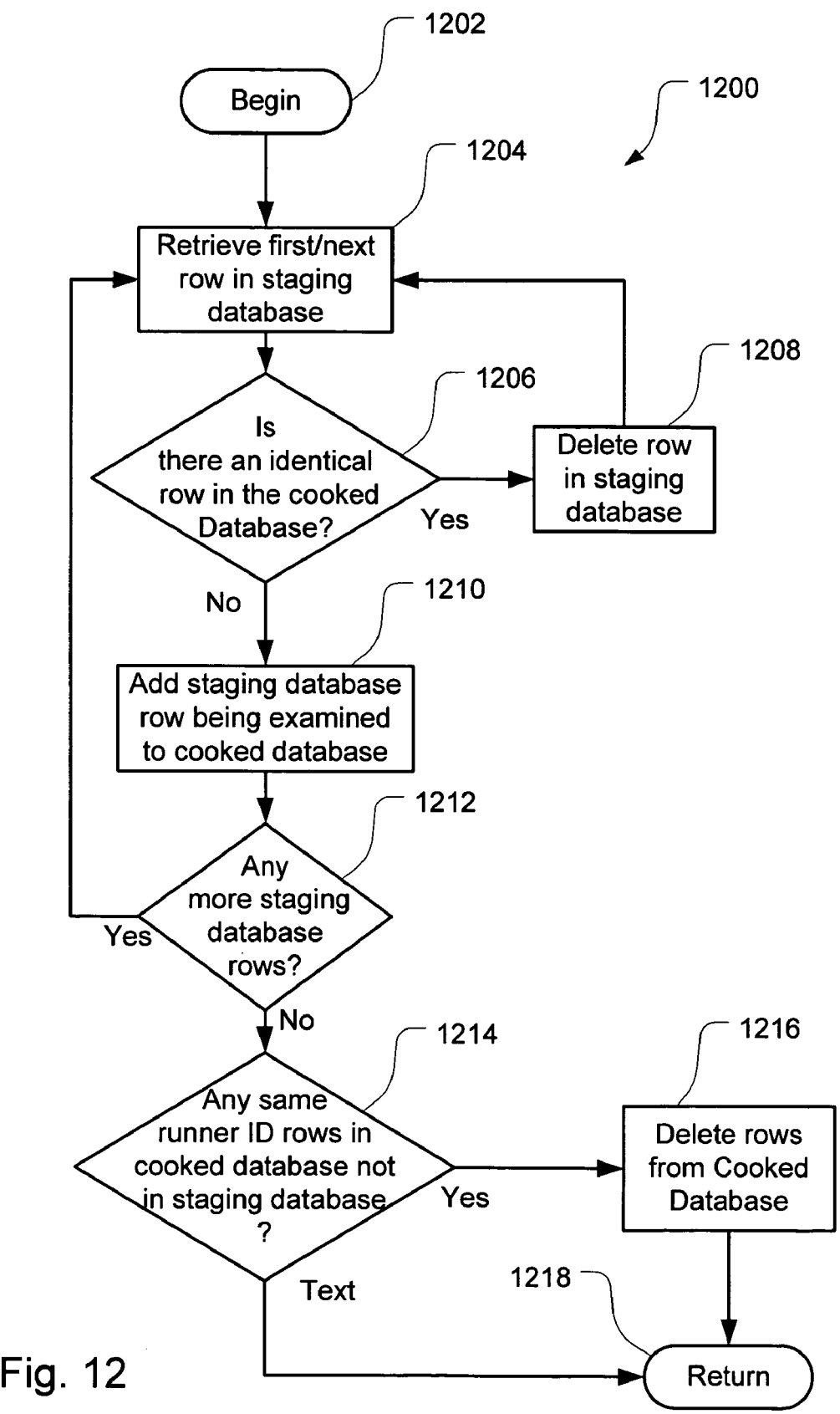
FIG. 12 is a flow diagram of a data de-duping process in the de-duping module in the system shown in FIG. 1.

In operation 518, a data set is retrieved from the staging database 222 and sent to the listing level de-duping task 1200 in the de-duping module 139. The Listing Level De-duping task is shown in FIG. 12. An exemplary set of table entries is shown in the following Staging table, Cooked Data table and De-Duped tables.

Staging Table 1

| TITLE | Description | City | State | Runner ID |
|---|---|---|---|---|
| SW Engineer | Java, C++ | San Jose | CA | 2 |
| Manager | Managing a team of five engineers | Fremont | CA | 2 |

COOKED TABLE 2

| TITLE | Description | City | State | Runner ID |
|---|---|---|---|---|
| SW Engineer | Java, C++ | San Jose | CA | 2 |
| Architect | Develops and communicates architectural blueprints | St. Louis | MO | 3 |
| General Manager | Responsible for all CWT business matters | Holland | MI | 2 |
| Consultant | Human Resources Consultant | Phoenix | AZ | 3 |

COOKED TABLE 3

| TITLE | Description | City | State | Runner ID |
|---|---|---|---|---|
| SW Engineer | Java, C++ | San Jose | CA | 2 |
| Architect | Develops and communicates architectural blueprints | St. Louis | MO | 3 |
| Manager | Managing a team of five engineers | Fremont | CA | 2 |
| Consultant | Human Resources Consultant | Phoenix | AZ | 3 |

First, the de-duping task 1200 looks for Row 1 in the Staging table 1 in the cooked data table 2. It is there. Therefore Row 1 is ignored. The Row 2 in the staging table is then compared to the cooked database to see if it is there. It is not. Therefore, Row 2 of the cooked data table 2 is added to the De-duped cooked data table 3. Next, the same process is repeated for each and every entry in the staging database. When this process of either ignoring or adding has been completed, the cooked data table 2 rows associated with runner number 2 are compared to the staging table 1 to determine if there are any runner 2 rows in the staging database that are not in the cooked database, table 2. In this example, the third entry in the cooked table 2 is not in the staging table 1. Therefore this entry, the general manager row, is deleted. The result is that the de-duped cooked database is regenerated and verified once per day or once per period as defined by the system administrator.

A more general diagram of the de-duping task process is shown in FIG. 12. The process 1200 is called when the data split task and the cleansing task have been completed on the data set having the thread runner ID stored in the staging database. Control begins in operation 1202 where initialization of the de-duping module 139 is completed. Control then transfers to operation 1204 where the first row in the staging database 222 is retrieved and examined against the row entries in the cooked database 236. Control transfers to query operation 1206.

In query operation 1206 the query is made whether there is an identical row in the cooked database. If there is, control transfers to operation 1208 the staging row being examined is deleted. Control transfers then back to operation 1204 where the next row in the staging database is retrieved and examined. If, however, the answer in query operation 1206 is no, there is no identical row in the cooked Database 236, then this row is added to the cooked database in operation 1210. Control then transfers to query operation 1212 where the query is made whether there are any more staging database rows. If yes, then control transfers back to operation 1204 where the next staging database row is retrieved and the process repeats. If no, the last staging database row has been examined, then control transfers to query operation 1214.

In query operation 1214, the rows in the cooked database 236 with the same runner ID are compared to the entries in the staging database. If there are any same runner ID rows in the cooked database that are NOT in the staging database, then these rows are deleted from the Cooked Database. The reason for this is that, if the staging database does not have the job listing, then the listing must have been pulled by the employer or filled, and thus removed from the bulletin board or career listings and thus is no longer a valid job opportunity to a job seeker, and thus of no use in this employment opportunity system. On the other hand, if all the same runner ID rows in the cooked database 236 are in the staging database 222, all are current, and control transfers to return operation 1218.

Now that the PALM master task scheduler 131 has seen the data set through the split task, the cleansing task, and the De-duping task, and the cooked database 236 is now de-duped for the particular data set, each new entry into the content of the cooked database 236 is submitted to the categorization task 522 and the quality manager tasks 524. The categorization task is described below with reference to FIGS. 6 and 7. The quality manager tasks are described with reference to FIG. 13.

Scraped jobs obtained through the scraping engines 218 do not have category assignments such as Accounting, Banking, Engineering, medical, dental, etc. In order for us to support the "browse by category" feature that jobseekers are most familiar with, many human categorizers would need to spend a great deal of time to manually classify jobs as they are scraped. However, this has substantial drawbacks. It is a very time consuming process. By the time the jobs are manually classified, they may be outdated already. Such a process requires a lot of human resources. Further different categorizers may not categorize in the same, consistent, manner. For this reason, the PALM system 200 includes an automatic Job Categorization System 600 shown in FIG. 6. This system 600 is capable of categorizing a job in a fraction of a second. It is substantially faster than human categorizer, and, it is consistent.

This Job Categorization System 600 contains several modules. A job categorization (Job Cat) Service module 602 which carries out the actual categorization routine. The Job Categorization engine module 140 described with FIG. 1, that manages communication between a Job_current table 626 in the cooked database 236, a manual category database 628, and the Job Category (Cat) Service module 602. A Categorization Training Process 606 performed by the category review module 132 is used to enhance and/or maintain the accuracy level of the Job Cat Service 602. This categorization training process 606 involves the use of the job categorization manual review interface module 132 and categorization experts that have access via intranet 116 shown in FIG. 1A.

As described above, the jobs scraped are added to a MySQL job_current table 626 in the cooked database 236 once they have cleansed and de-duped. Then the Job Categorization Process 600 will take each job from the job_current table 626, and send it through the job categorization control process module 622 to the Job Cat Service module 602 to get a category and confidence assignment. Then the scraped job is sent back to the categorization control process module 622 and returned to the job_current table 626. However, if a job falls below a predetermined confidence threshold it will be flagged, i.e. a flag set, and when it passes through the categorization control process module 622 a copy is also sent to the mancat database 628 for manual review via the manual review interface module 132. The results of the manual review process performed in review module 132, are then used by the Categorization Training Process 606 to tune a new Job Cat Service value to replace the old one. The result of classification is written back to job_current table 626 and sometimes the mancat table 628. The Manual review module 132 provides a UI to review both jobs in job_current and mancat tables.

Figure 7:
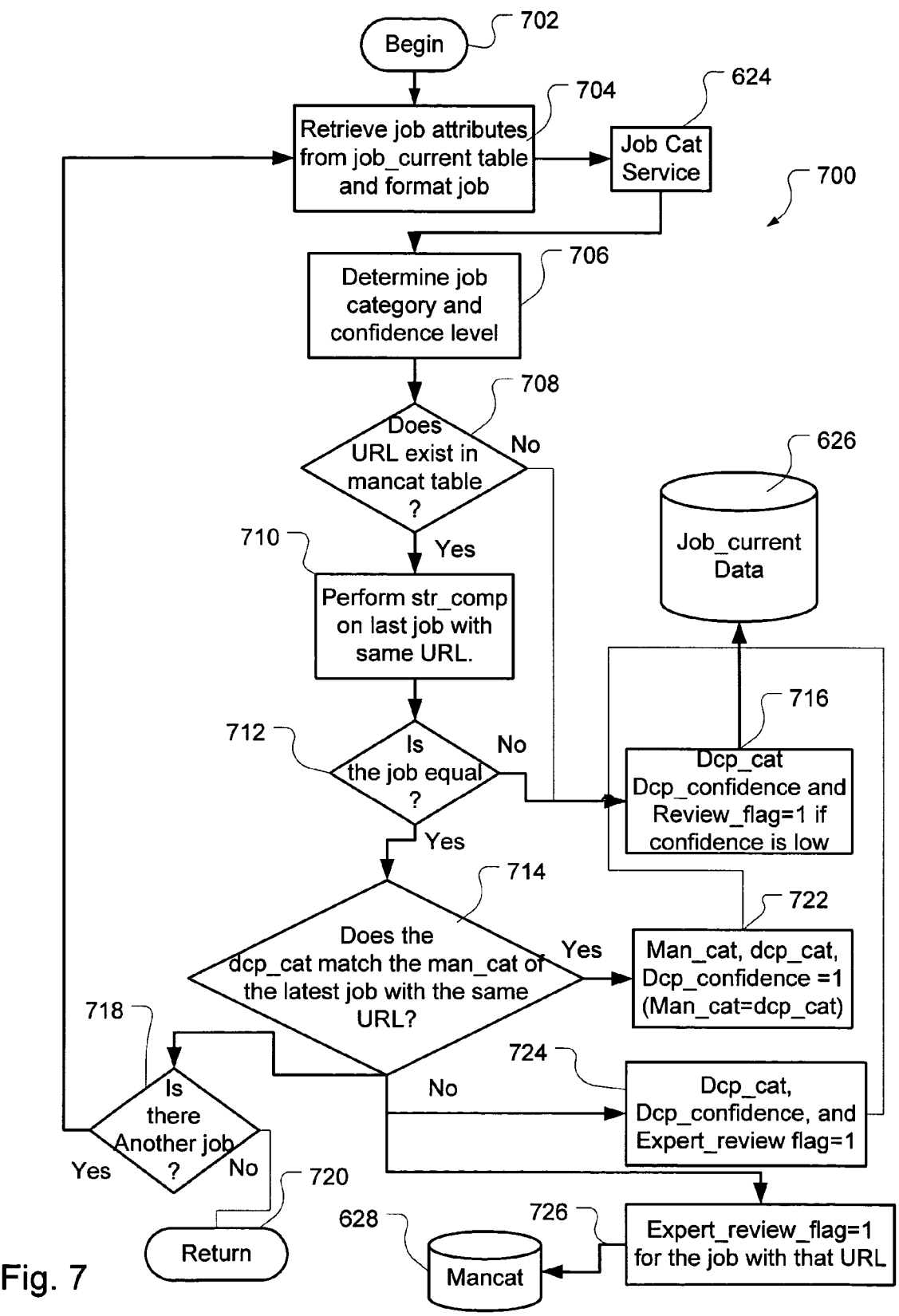
FIG. 7 is an operational flow diagram of the job categorization process in accordance with an embodiment of the system shown in FIG. 1B.

FIG. 7 is an operational flow diagram of an implementation of the job categorization process 600. The process begins in operation 702 when a sequence of job scrapings has been performed. Control transfers to operation 704. In operation 704 the job attributes for the next job are retrieved from the job_current table 626 and the job description is properly formatted. The job attributes are then transferred to the job cat service 602 to find a proper category. Control then transfers to operation 706 where the job category and confidence level for that categorization are paired with the job. Control then transfers to query operation 708.

Query operation 708 asks whether there is a matching URL existing in the mancat table for the latest particular job description. If there is, then control transfers to operation 710. If not, the job is a new job, and control transfers to operation 716.

In operation 710, a string compare routine is performed on the last job with the same URL. Control then transfers to query operation 712. Query operation 712 asks whether the listing in the mancat table 628 is the same as the current job being examined. If the job string compare is equal, then the answer is yes, and control transfers to operation 714 since it appears that the job is the same job. On the other hand, if the answer is no, the job is new, and control again transfers to operation 716.

Query operation 714 asks whether the dcp_cat matches the man_cat of the latest job with the same URL. If the answer is yes, then the man_cat and dcp_cat are set equal and the dcp_cat confidence is set equal to 1. The job parameters back to the job_current table 626, and control transfers to query operation 718. Query operation 718 asks whether there are more scraped jobs in the job_current table to be categorized. If not, control transfers to return operation 720. If there are more scraped jobs to be categorized, control passes back to operation 704 and the job parameters for the next job are retrieved and formatted.

Returning to query operation 708, if the URL does not exist in the mancat table, then control transfers to operation 716. In operation 716, the Dcp_cat and dcp_confidence are set, the confidence value is checked against the threshold that has been predetermined, and if the threshold is greater than the confidence value, the review_flag is set equal to 1. The job parameters are then passed to the job_current table 626 and again, control passes to query operation 718.

Returning to query operation 714, if the current jog has a URL in the mancat table 628, the job is the same as the last job with the same URL, but the dcp_cat and an_cat of the latest job do not match, then something may be wrong or missing, and the job parameters are passed to both operations 724 and 726. Operation 724 sets the dcp_cat, the dcp_confidence values, sets the expert_review flag=1 and feeds this data to the Job_current table 626. Operation 726 sets the expert_review flag=1 and sends a copy of this job's parameters to the mancat database 628 so that manual review will be performed. In parallel, control again passes to the query operation 718 as described above.

Thus, for each job, the Job Categorization Control Process take job attributes from the job_current table, formats them, and sends them over to Job Cat Service (managed by a well known public domain routine called Apache, method=POST), gets back a category and confidence score, goes through a chain of decision questions, and writes results back to the tables.

Figure 8:
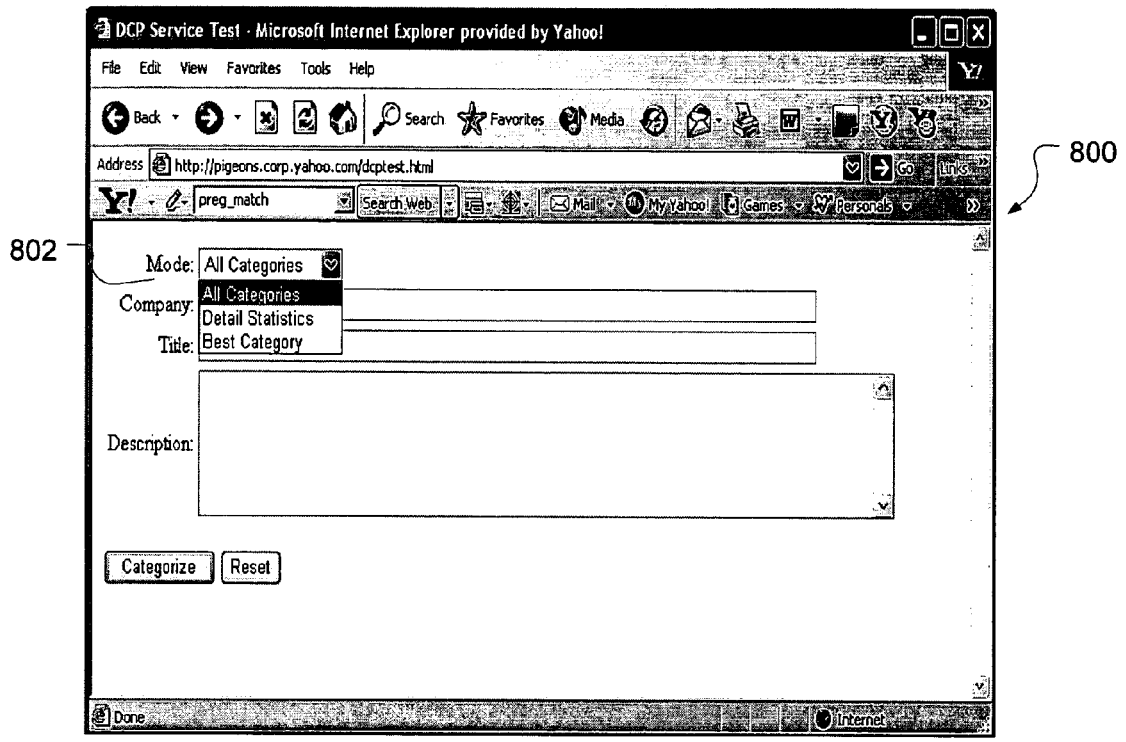
FIG. 8 is a screen shot of an exemplary document categorization platform service user interface for the job categorization process.

The Job Cat Service 602 also provides a web UI that allows administrators and system operators to type in a job (at least the job description) and submit the job to the Job Cat Service for categorization separately from the normal operation of the system 100. Such an exemplary user interface 800 is shown in FIG. 8.

Figure 6:
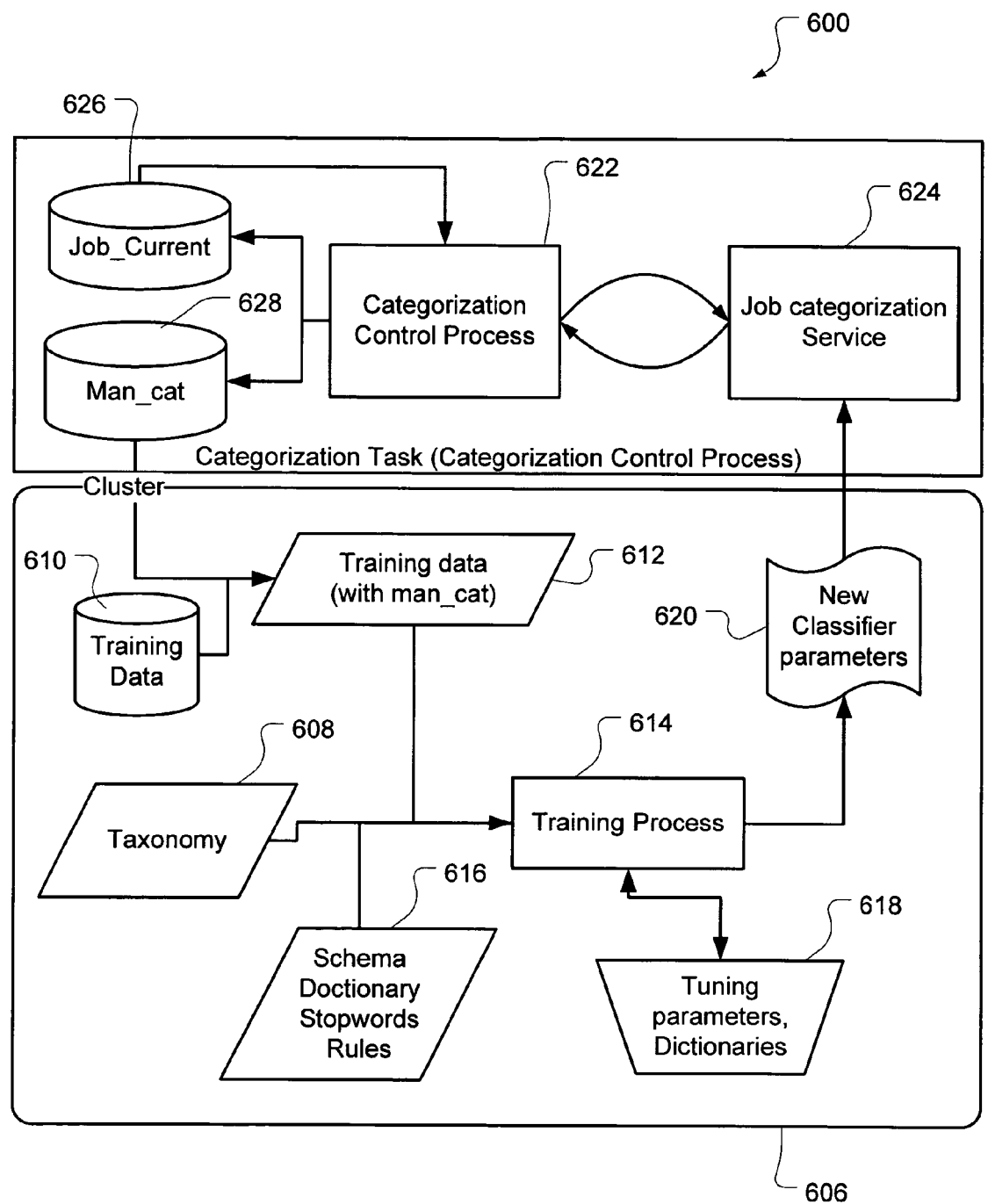
FIG. 6 is diagram of the job categorization control module in the embodiment of the system shown in FIG. 1.

The Job Cat Service module 602 depends on Apache, a well known web server for hosting training process 606 shown in FIG. 6. The Job Cat Service 602 contains a binary package that is a shared library of PHP extensions and also includes a Categorization library. Building the Job Cat Service 602 first requires a set of basic definitions i.e. a taxonomy 608, of job categories and associated unique ID numbers. An exemplary set is shown in Table 1 below.

TABLE 1

| Cat_id | Cat_name |
| --- | --- |
| 1 | Accounting_Finance |
| 2 | Advertising_Public_Relations |
| 3 | Arts_Entertainment_Publishing |
| 4 | Banking_Mortgage |
| 5 | Clerical_Administrative |
| 6 | Construction_Facilities |
| 7 | Customer_Service |
| 8 | Education_Training |
| 9 | Engineering_Architecture |
| 10 | Government |
| 11 | Health_Care |
| 12 | Hospitality_Travel |
| 13 | Human_Resources |
| 14 | Insurance |
| 15 | Internet_New_Media |
| 16 | Law_Enforcement_Security |
| 17 | Legal |
| 18 | Management_Consulting |
| 19 | Manufacturing_Operations |
| 20 | Marketing |
| 21 | Non_Profit_Volunteer |
| 22 | Pharmaceutical_Biotech |
| 23 | Real_Estate |
| 24 | Restaurant_Food_Service |
| 25 | Retail |
| 26 | Sales |
| 27 | Technology |
| 28 | Telecommunications |
| 29 | Transportation_Logistics |
| 30 | Work_At_Home |

An exemplary table of training job descriptions, training data 610, is associated with each of the categories in Table 1. This set of descriptions, plus the content of the mancat database 628, is used to teach the Service to recognize classifications from the provided job description parameters that are preclassified. An example of this table is shown in Table 2 below.

TABLE 2

| Field | Type | Null | Comment |
|---|---|---|---|
| Pindex | Varchar(11) | No, Primary key | |
| Title | Varchar(11) | Yes | |
| Ldesc | Text | No | |
| Mancat | Varchar(101) | No | Actually set to the first industry setting initially |
| Gid | Int | Yes | Group id, some id are used by HJ internal for testing, they should not be used for training |
| Hiretype | Varchar(21) | Yes | |
| Companyname | Varchar(101) | Yes | |
| Salarytype | Varchar(21) | Yes | |
| Sdesc | Varchar(101) | Yes | |
| Sourcetype | Varchar(11) | Yes | |
| Source | Varchar(21) | Yes | |
| Duration | Varchar(3) | Yes | |
| Position | Varchar(21) | Yes | Experience level |
| Degrees | Varchar(31) | Yes | |
| Salaryfrom | Float | Yes | |
| Salaryto | Float | Yes | |
| Ownerid | Varchar(11) | Yes | |
| Creatorid | Varchar(11) | Yes | |
| Editorid | Varchar(11) | Yes | |
| Ctime | Date | Yes | Date created |
| Mtime | Date | Yes | Date modified |
| Score | Int | Yes | The YSS score, not used |

For new training sessions, it is preferable to use both jobs from this table and those in the mancat table. As more and more manual reviewed jobs become available, it is preferable to eventually drop the original training set from the read-only database.

In a preferred embodiment the columns of this table 2 and the mancat table are different, and this difference will remain, and the script that creates the training file will do all necessary mappings. The training process 606 consists of several PEARL scripts. A "create-training-file.pl" script takes jobs from both the mancat table 628 and a train data table 610, and writes out a file containing all jobs in a DCP accepted format to generate the merged training data 612. A "train-hj-dcp.pl" script is used to tune a few of the most useful parameters for classification. Each of the configurations specified will leave an output directory containing all the parameters that are needed to build a Job Cat Service data package, and a log file.

A "parse-training-log.pl" script reads each of the log files generated by the train-hj-dcp.pl script and generates a report on accuracy for each configuration. An "archive-training-results.pl" script is used to archive the training results for that configuration after a configuration is used for deployment.

The training process 614 is basically a manual process that draws from the training data 612, the taxonomy 608, and sets of rules and schema 616. Various dictionaries and tuning parameters 618 may also be utilized. The results involve optimization of new classifier parameters 620 with the results being provided into the job categorization service 602 as shown in FIG. 6. Since the training process 614 is mostly manual, it is preferable to train on a few parameters, manually check the results, e.g. detail pages of classification, term weights, etc, and change some of the rules and dictionaries by hand, and repeat the process with different configurations in order to find the optimal settings for deployment. When such an optimal configuration is achieved, the new classifier parameters 620 are passed to the Job Categorization Service 602. Once the Job Categorization Service 602 is built up and running, scraped jobs can then be processed as described above.

The following discussion provides a detailed explanation of the listing categorization process of the present disclosure using an exemplary job categorization process.

In an exemplary Lexical Analysis, three text fields are processed: (1) title, (2) Job description and (3) Company category. A lexer (lexical-analysis module) may apply the following processing steps:

1. Common HTML character-entity references are replaced by their corresponding ASCII characters.
2. Text fields are then split into strings by treating any non-alphanumeric character as a delimiter (A single quote mark is treated as alphanumeric character).
3. A job title test is applied to all strings. A job title is defined as any string that satisfies the regex [0-9]*[A-Z]+[A-Z0-9]*. All strings are reduced to lower case.
4. All strings are stemmed using the Porter stemmer. (M. F. Porter. "An algorithm for suffix stripping"; Program, 14(3):130-137, 1980. Reprinted in Sparck Jones, Karen, and Peter Willet, 1997, Readings in Information Retrieval, San Francisco: Morgan Kaufmann, ISBN 1-55860-454-4, herein referred to as "Porter")
5. A pre-defined list of stop words is used to filter out very common features from the text fields. Strings consisting of purely digits are also eliminated.

Examples of stop words are:

| | | | |
|---|---|---|---|
| job description | be able | right candidate | qualified applicants |
| job id | your resume | qualified candidate | interested candidate |
| job title | seeking | equal opportunity | interested candidates |
| job summary | be considered | eoe | interested applicants |
| such as | can enjoy | qualified candidates | duties |
| currently seeking | ideal candidate | contact information | focused on |
| are seeking | ideal candidates | remain | emphasis on |
| click here | successful candidate | find out | depending on |
| selected candidate | further information | come join | are met |
| highly desired | should forward | please note | follow through |
| strongly desired | without regard | please sent | work closely |
| strongly preferred | subject line | please indicate | board range |
| strong | online below | please submit | wide range |
| preferred | listed below | please visit | wide variety |
| are encouraged | when applying | primary responsibility | conjunction with |

| | | | |
|---|---|---|---|
| button below | when submitting | | word attachment |
| make sure | be contacted | | |
| | contact us | | |

Certain bigrams (two-word phrases) are detected as single tokens. Higher order n-grams) may also be used in categorization.

The following are examples:

| | | | |
|---|---|---|---|
| human resources | at least | self starter | tuition reimbursement |
| equal opportunity | power point | accounts payable | customer service |
| pay rate | click here | seque appli | positively impacting |
| problem solving | ajilonfinance com | funct subfu | human resource |
| d v | boehringer ingelheim | registered trademark | san francisco |
| more than | immediate | los angeles | award winning |
| united states | consideration | full time | decision making |
| cover letter | new york | spirited | metropolitan area |
| ideal candidate | track record | entrepreneurial | credit union |
| long term | stock purchase | barnes noble | benefits package |
| job description | loss prevention | ad hoc | wide range |
| job title | ag 2002 | wild kingdom | multi task |
| job summary | ajilon finance | voice messaging | sarbanes oxley |
| duties | fortune 500 | affirmative action | p sou |
| air force | fastest growing | iras cancer | valid driver |
| kaiser permanente | general ledger | tuition assistance | |
| deutsche telekom | real estate | | |
| | test plans | | |
| | journal entries | | |

Each unique string resulting from these steps constitutes a unique token. Certain tokens are added additional weight and is tracked in a weight.dict file. Here is a job specific sample of the file:

position-dependent rule one may implement is to weight the last word of the title more heavily in an attempt to find the head noun in a noun phrase (i.e. the title), which may lead to a slight increase in accuracy.

One may also use token-feature clustering (e.g. distributional clustering) where several tokens (members of a single cluster) are all treated as the same token.

| | | | |
|---|---|---|---|
| general ledger 2 | per week 3 | technical sales 3 | development |
| inpatient 2 | nurse 3 | planning analyst 2 | lifecycles 2 |
| outpatient 2 | registered nurse 3 | budget planning 3 | operating systems 2 |
| claims adjusting 3 | human resource 3 | financial planning 3 | programming |
| estimate damage 3 | college degree 3 | financial statements 3 | languages 3 |
| ASIC design 3 | hs degree 3 | financial reports 3 | business skills 2 |
| logic design 3 | systems administrator 3 | corporate tax 3 | communication |
| residential purchase 3 | accounts receivable 3 | worker compensation 3 | disorders 2 |
| refinance products 3 | accounts payable 3 | business development 3 | speech language 2 |
| mortgage products 3 | fixed assets 3 | market development 3 | speech therapy 2 |
| mortgage loan 4 | medical terminology 3 | trade shows 4 | speech pathology 2 |
| mortgage brokers 3 | legal terminology 3 | forklift operator 2 | speech therapist 2 |
| mortgage lender 3 | public relations 3 | forklift certified 2 | speech pathologist 2 |
| call center 3 | product marketing 3 | food service 3 | switchboard 2 |
| customer service 3 | clinical research 3 | real estate 3 | telephone skills 2 |
| answers telephone 3 | clinical trials 3 | social services 4 | blood drives 2 |
| inventory control 3 | clinical data 3 | internet publishing 2 | blood centers 2 |
| quality assurance 3 | direct sales 3 | | plasmapheresis |
| object oriented 4 | | | process 2 |
| | | | phlebotomist 2 |

The "feature" corresponding to each text token may simply be the per-document count of the occurrences of the token in the document. Each token instance may be assigned a weight that depends on the field from which it was extracted and may depend on the position of the feature within the field. Specifically one may multiply the token counts from the Title and Company Category by two before adding them to the overall count. The Description term counts may be taken unaltered. A As discussed above, the job records may contain fields that aren't free text. They may include: (1) Company id and (2) Salary, and others. Embodiments in which these features are used are described in the section entitled Category Refinement.

Feature selection may be performed by ranking individual features x by their mutual information $I(C,X)$ with the category variable:

$$I(C, X) = \sum_c \sum_{x=0}^{1} p(c, x) \log \frac{p(c, x)}{p(c)p(x)}$$

where the x sum is over x=0 and x=1 and the c sum is over all the categories (classes). The probability estimates for p(c, x) are obtained by simple counting and the binary variable x indicates the presence (x=1) or absence (x=0) of the associated term. In terms of the terminology this is, strictly speaking, a different feature than the associated term count used in a classifier (Naïve Bayes, for example) for actual categorization. This may be beneficial for numerical reasons. The alternative is to sum over all possible term counts from 0 to infinity, which may cause problems due to the potential sparseness of the associated probability estimates.

The ranked list is processed in order of decreasing mutual information. For each number m of features a classifier is trained using the first m from the list and its accuracy is measured using cross validation. Features are added until the accuracy measured this way starts to decrease.

The number of features may also be controlled by setting a frequency-threshold limit. Features whose frequency is less than the threshold limit may be eliminated. There may be two or three combinations of the threshold and number of features that result in the best accuracy figures as reported by cross validation.

According to one aspect of the disclosure a method for categorizing a job offering in multiple passes is provided. The first step is performing a first categorization to associate the job with a first category. If the first job category is in a set of co-refinable job categories, performing a second categorization within the set of co-refinable job categories to associate the job offering with a second job category. Further, the second job is in the set of co-refinable job categories, the first job is in a first set of jobs, and the set of co-refinable job categories is a proper subset of the first set of jobs. A set of co-refinable job categories is defined as a set of job categories that have, by any method, been determined to have relatively high likelihood of being confused (one for another) or having one job category in the set being chosen in place of another job category in the set.

Those categories that are selected for use in the second pass, the co-refinable job categories, are selected based on the category that you are looking at. For example, the co-refinable job categories may be determined based on likelihood of confusing the other categories for the particular category. One method of determining whether two categories are often confused is to perform a manual categorization of a set of jobs. The manual categorization will be treated as correct—the gold standard. Then perform an automatic categorization of the same set of jobs. Graph the results in a matrix where one axis represents the categories chosen by the gold standard (in this case manual) categorizer and the other axis represents the categories chosen by the automatic categorizer. Excluding all of the cells in the matrix where the manual and automatic categorization chose the same category (possibly along the diagonal, depending on implementation), the cells with the highest probability represent the categories that are most likely to be confused. The set of co-refinable product categories may then be based on the cells that are most likely to be confused, and may, in fact, contain multiple distinct sets of co-refinable product categories and these sets may each contain a different number of categories than the other.

Herein is provided one example of category refinement. The techniques described herein are not limited to such an embodiment. Consider an automatic classifier built based on a Naïve Bayes categorizer. Example Naïve Bayes categorizers are described in David D. Lewis, "Naïve (Bayes) at forty: The independence assumption in information retrieval"; in Claire N'edellec and C'eline Rouveirol, editors, Proceedings of ECML-98, 10th European Conference on Machine Learning, number 1398, pages 4-15, Chemnitz, D E, 1998, herein referred to as "Lewis". The categorizer may have two or more levels of categorization. At the top (root) level 610 one may perform a flat categorization where each category is described by a single multinomial distribution as described in the section entitled Naïve Bayes. One may use a mixture of multinomials to model the term-probability distribution for certain categories. Strictly speaking, this violates the Naïve Bayes conditional-independence assumption, but one may simply assume that certain categories may be further decomposed into other categories that do follow the assumption, but it is unknown a priori what they are.

Then a second categorization is performed on certain categories that are in a set of co-refinable categories. The categories may be those in the list below, which has been divided into three "confusion groups". The top-level nodes in each group have classifiers that perform a second classification into just the categories in the confusion group.

For Company id one may use the simplest possible model—multi-Bernoulli. That is, one may have a different probability-value estimate for every (category, company) pair. That is, one may have estimates for the set of values $\{p(c|m)\}$ where m represents company id. These values are denoted by $\{\psi c, m\}$.

Describing Salary statistics with a log-normal distribution: Salary may be approximately distributed according to a Log-Normal distribution, which means simply that log-price is distributed according to a simple Normal/Gaussian distribution. Let z=log (price). Resulting in the following, where $\mu_c$ and $\sigma_c$ are the mean and standard deviation of a Normal distribution:

$$p(z|c) = \frac{1}{\sigma_c \sqrt{2\pi}} \exp\left\{-\frac{1}{2}[(z-\mu_c)/\sigma_c]^2\right\} \quad (1)$$

The Naïve Bayes Classifier for Text

In machine learning and pattern classification the objects to be categorized (or "classified") are represented by what are referred to as "feature vectors" x, which contain the information that is used to determine the most likely category that the document belongs to. The so-called "Naïve Bayes" classifier for documents assumes something called the "bag-of-words" model (see Lewis). This means that the particular sequence of words is ignored and only their counts are used. This limitation is circumvented somewhat when phrases are detected as tokens and treated as if they were individual terms. In the (Naïve Bayes) case the feature vectors may be of the form:

$$x=(k_1, k_2, \ldots, k_m),$$

where $k_i$ denotes the number of occurrences (in the document to be categorized) of the $i_{th}$ term and m is the total number of terms in the lexicon, which in this case refers to the set of terms being used to do the categorization, after stopword removal and so on.

The Bayes Classifier may use probability models in the following way: Given a feature vector x, compute the conditional probability that the document belongs to category c given the document's feature vector x. To perform categorization, choose the value c' for c (i.e. the assignment of the document to a category) that maximizes p(c|x). Mathematically, this may be expressed as:

$$c'=\arg\max_c p(c|x)$$

This conditional probability p(c|x) may be decomposed as follows:

$$p(c|x)=(p(x|c)p(c))/p(x)$$

Because one may only interested in the value of c' and not the specific value of p(c'|x) one may ignore the marginal probability p(x), which only depends on x and not c:

$$c'=\arg\max_c[p(x|c)p(c)]] \quad (5)$$

The probability in this equation is the joint probability p(x, c):

$$p(x,c)=p(x|c)p(c)$$

To carry out the actual categorization process specific formulas are needed for p(c) and p(x|c). The Naïve-Bayes/bag-of-words model may use a multinomial distribution for this. That is:

$$p(x \mid c) = \binom{n}{\{k_i\}} \prod_{j=1}^{n} \theta_{c,j}^{k_j} \quad (6)$$

This formula includes the following shorthand notation for something called a "multinomial coefficient":

$$\binom{n}{\{k_i\}} \equiv \frac{n!}{\prod_{i=1}^{n} k_r^j} \quad (7)$$

where n! represents "n factorial" and denotes the product:

$$n!\equiv n(n-1)(n-2)(n-3)\ldots 3\times 2.$$

Because this multinomial coefficient is a function of only the document and not the class, it too may be ignored in the categorization process. The parameters $\{\theta_i\}$ are often referred to as "Bernoulli" parameters and may be estimated from the training data. This ("{ . . . }") is a shorthand set notation. For example $\{\theta_i\}$ really denotes $\{\theta_i|i=1, 2, \ldots, m\}$, i.e. the complete set of these parameter values.

For each category, one may have values for p(x|c) and p(c) and each of these may have their own estimated parameter values. The Bernoulli parameter for term i within category c is represented and may be estimated by the following:

$$\theta'_{i,c} = \frac{n_{i,c}+1}{n_c+m} \quad (8)$$

where $n_{i,c}$ is the total number of instances of term i in the entire collection of category-c training documents, $n_c$ is the total number of instances of all terms in the entire collection of category-c training documents (terms in the categorization lexicon; not stop words, etc.), and m is the total number of terms in the lexicon. The formula (8) is known as "Laplace's rule" or "Laplace's Rule of Succession".

To perform the categorization described by (5) one may need estimates for the marginal class probabilities {p(c)}. One may represent these estimates by $\phi'_c$ and use a form of Laplace's rule for them also:

$$\phi'_c = \frac{v_c+1}{N+|C|} \quad (9)$$

where $v_c$ is the total number of category-c documents in the training set, N is the total number of documents (all categories) in the training set, and |C| is the total number of categories. If these numbers ({$v_c$} and N) aren't representative of the ultimate population of documents to be categorized, then the correct estimates (obtained by whatever means) may be used for the $\{\theta'_c\}$.

The "discriminant function" d(x, c) may be defined as:

$$d(x, c) = \phi'_c \prod_{i=1}^{n} \theta_{i,c}^{k_1} \quad (10)$$

An implementation of the categorization described by (5) may be expressed in terms of this as follows:

$$c'=\arg\max_c d(c,x) \quad (11)$$

It may be beneficial to use the logarithm of (10) as a discriminant function for both numerical and computational reasons. Thus one may have:

$$d(x, c) = \log\phi'_c + \sum_{i=1}^{m} k_i \log\theta'_{i,c} \quad (12)$$

The screen shot of the exemplary user interface 800 is presented to an administrator, operator or categorization expert through the intranet 116 using a web browser. The interface 800 provides three different modes 802 via a pull down menu as shown. The "all categories" mode lists all categories and their corresponding confidence values, sorted in descending order by confidence. The "Detail Statistics" mode shows the details on why a particular category is chosen. This mode is useful for an operator who tunes the system 200. The "Best Category" mode shows only the top category for the job and its confidence. This is equal to the first result shown in "All Categories" mode, except here we show the category ID number, not a string. This mode is intended for automatic classification of jobs in the database, where the category ID number is preferred over the category name.

Figure 10:
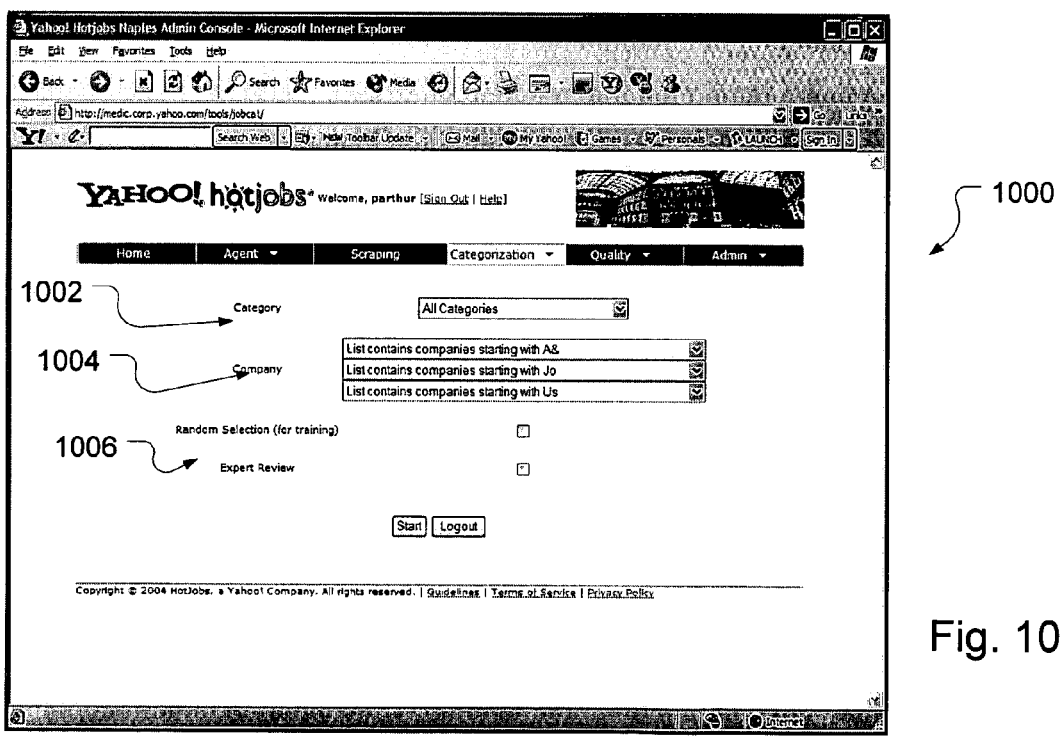
FIG. 10 is a screen shot of an exemplary user interface for a job categorization manual review interface module.
Figure 9:
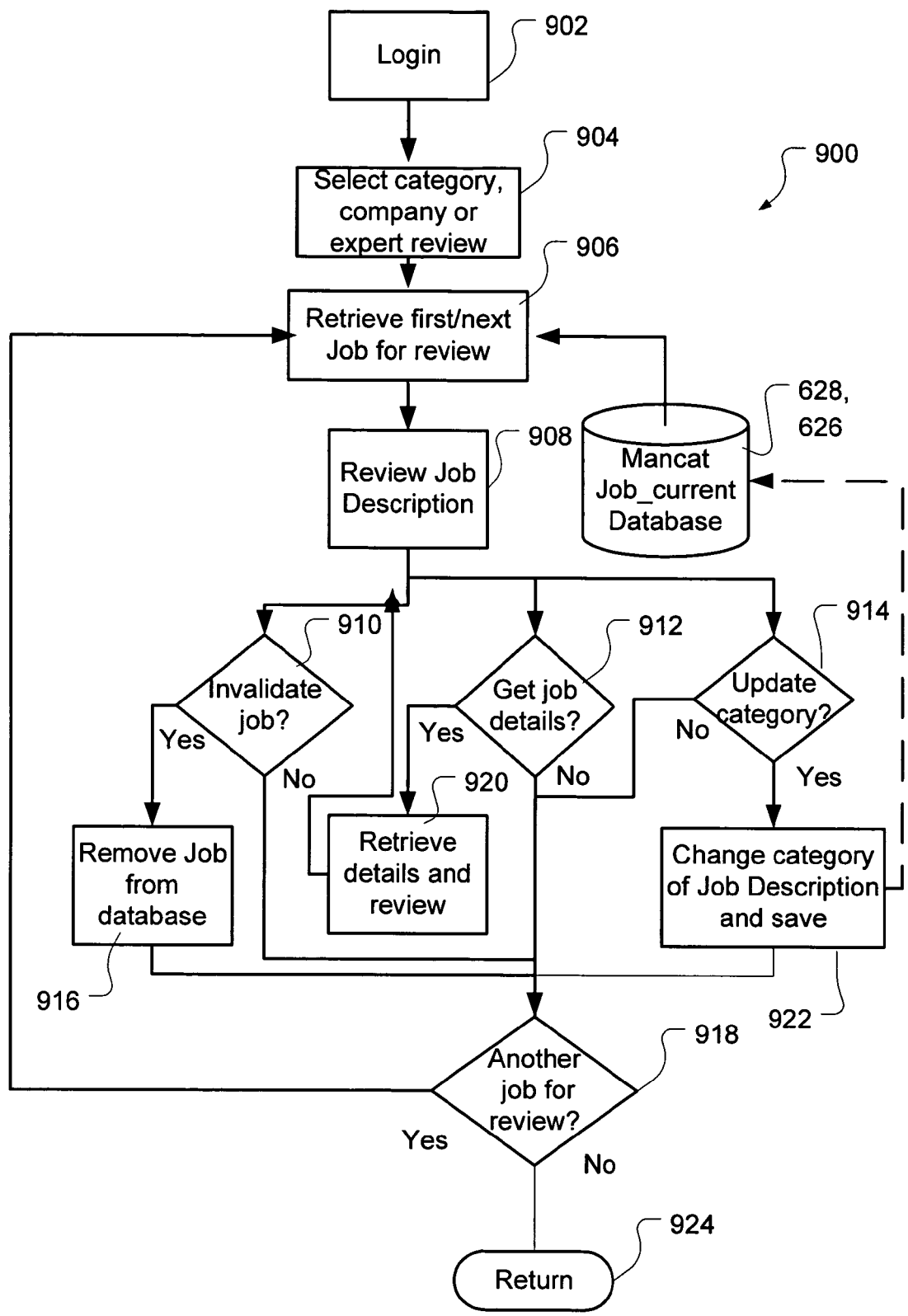
FIG. 9 is a process flow diagram for a job categorization manual review interface module.
Figure 11:
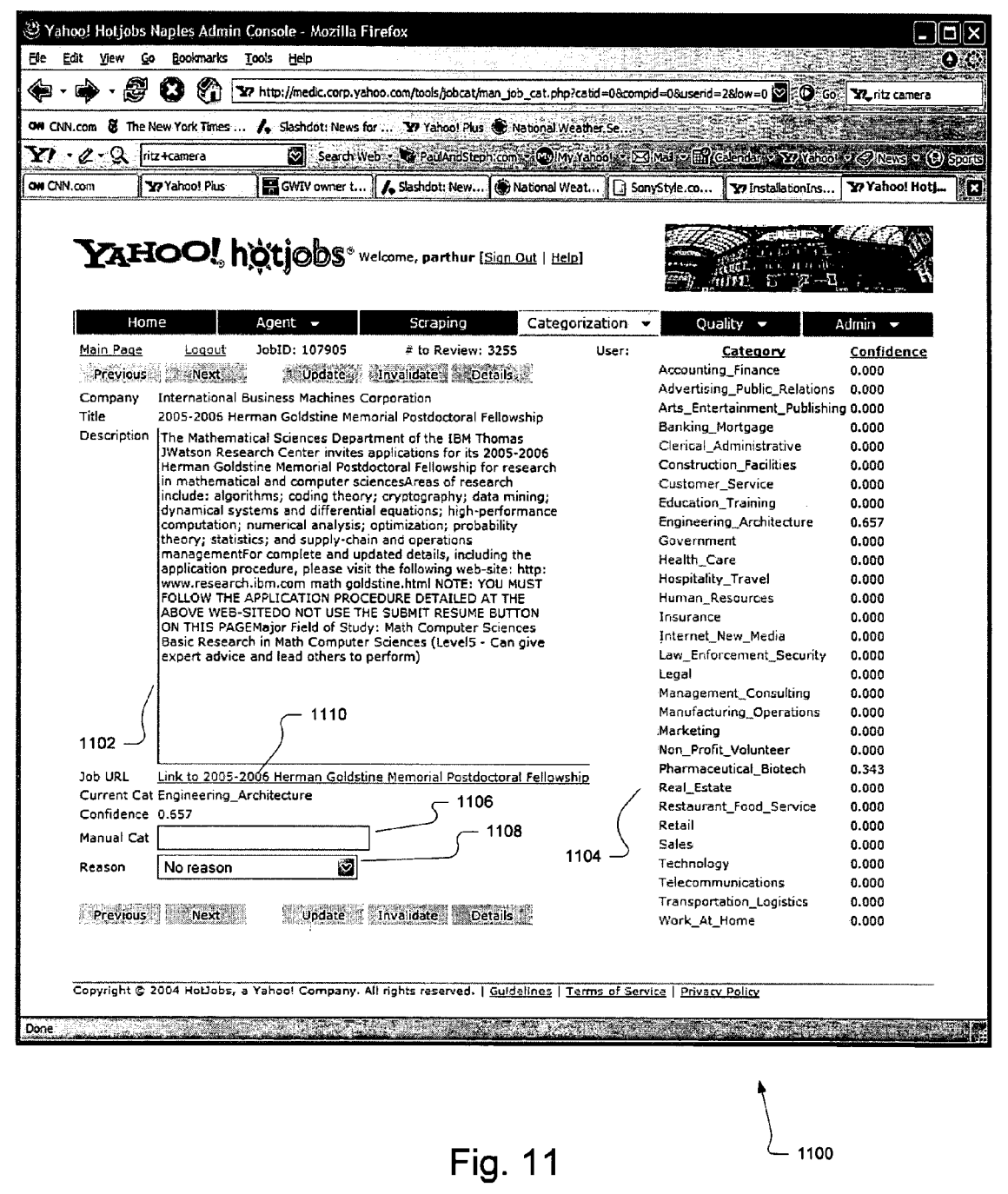

An operational flow diagram of the job categorization manual review process 900 that takes place in the job categorization manual review module 132 is shown in FIG. 9. Operational flow begins when an administrative operator or a categorization expert logs in via the PALM administration portal 102 in operation 902. When the administrator logs in, he or she is presented in operation 904 with a user interface 1000 as shown in FIG. 10. This user interface 1000 permits the administrator or expert reviewer choices of job category 1002, company 1004, and selection of a type of review 1006 to conduct. Control then transfers to operation 906. In operation 906, a first/next job description is retrieved from the mancat database 628 or the job-current file 626 in the cooked database 236, depending on the administrator's prior selections in operation 904. The administrator is presented with a user interface such as the exemplary interface 1100 shown in FIG. 11.

This user interface 1100 displays the first/next job description 1102 along with the category confidence levels determined for each category. In this example, the job is a post-doc position at IBM Corp. The confidence levels are zero for all but Engineering_Architecture and Pharmaceutical_Biotech, and none of the levels match 100%. This position has been categorized as Engineering Architecture, but the confidence level is only 0.657, so it was flagged for manual review.

Referring back to FIG. 9, when the job description is retrieved in operation 906, control transfers to operation 908 where the administrator analyzes the categorization based on the full job description. The administrator then has three choices of action. First, he can invalidate the job in query operation 910. Second, he can get more job details in query operation 912 by clicking on the job URL 1110 to enhance his review. Third, he can update a category definition or insert a new category in query operation 914. If his decision is to invalidate the job in query operation 910, then control transfers to operation 916 where the job is removed from the database 126 and from the mancat database 628. Control then transfers to query operation 918. Query operation 918 asks whether there is another job description in the queue of the mancat database 628 or job_current table 626 that has its expert_review flag=1 set. If so, control transfers back to operation 906 where the next job is retrieved for review.

However, if the decision in operation 910 is not to invalidate the job, control resets the expert_review flag=0, returns the job to the job_current table 626 and control transfers to query operation 918. If the choice in operation 908 is to get more job details, control transfers to operation 920, where the details are retrieved and control transfers back again to operation 908. If the administrator then chooses not to get more details, the job description record is again returned to the job_current table 626 after resetting the expert_review flag=0 and control passes again to query operation 918. If the choice in operation 908 is to update the category in query operation 914, then control passes to operation 922.

In operation 922 the category of the job description is changed, or a new one added, and saved. The expert_review flag is set=0 and the job description is then transferred to the job_current table 626 and control transfers to query operation 918. If there are no more job descriptions with expert_review flags set=1, control transfers to return operation 924 and the review session is complete.

Additionally, it is preferable that a job categorization control process module 622 reviews periodically the information in the cooked database 236 in order to accurately categorize each job listing. It is important that a job listing be placed in the proper job category, such as for example, information technology, healthcare, accounting, etc. The job categorization control process module 622 preferably is automated or, through a manual review interface module 134 may be augmented by input from categorization experts, which are preferably human. However, the function of the experts may alternatively, is as the case with listing reviewer entities discussed earlier, be automated routines in the future as such systems become more sophisticated. The job categorization control process module 622 is preferably automated, while the manual review process module 134 provides a check on quality, thus providing a high degree of accuracy in job categorization. The results of this categorization process are stored in "mancat" database 628, which is a contraction name for the manual categorization database.

Figure 13:
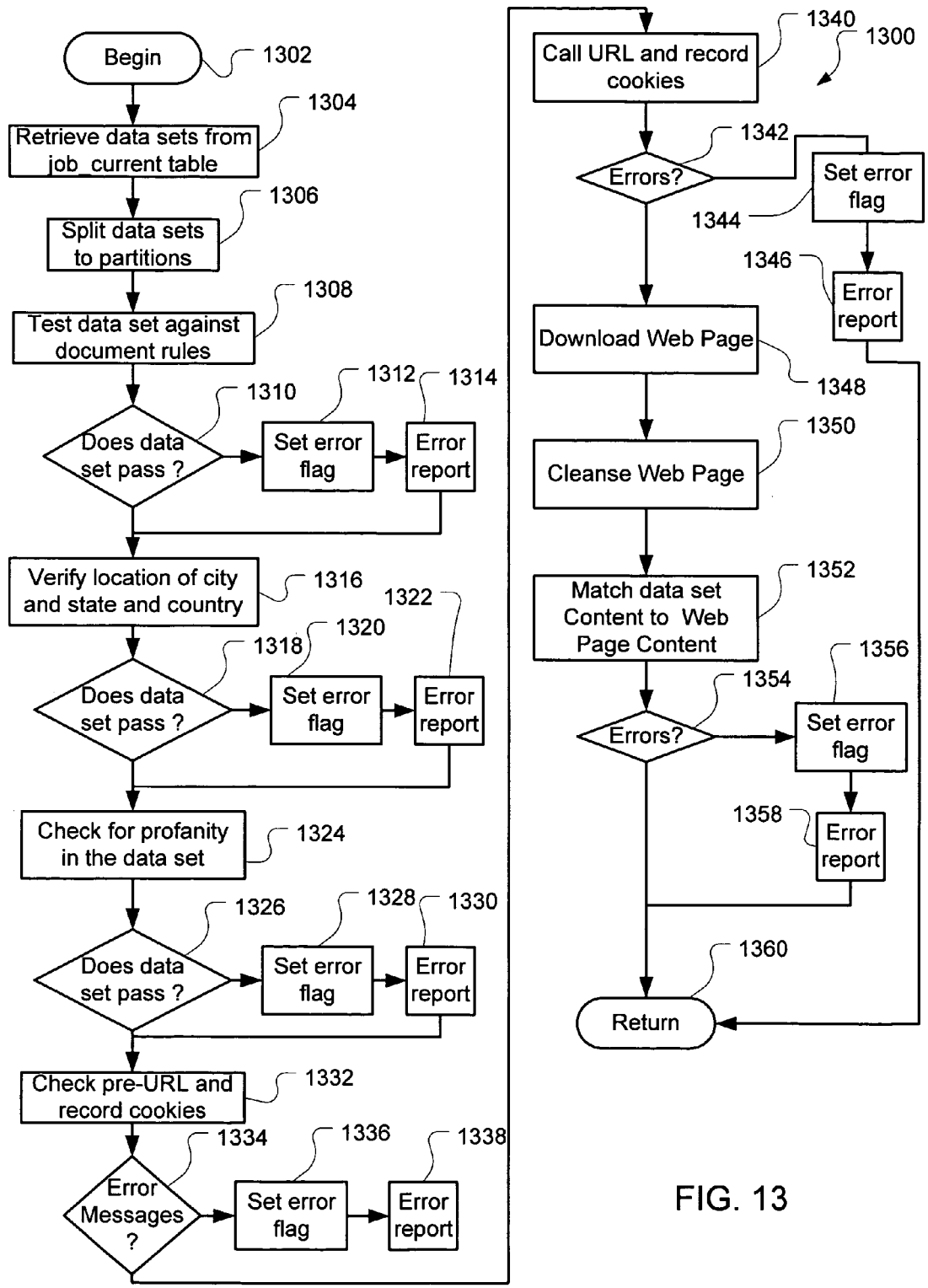
FIG. 13 is a flow diagram of the quality engine process shown in FIGS. 1B and 1C.

In the Quality Manager task, shown in FIG. 13 each entry row in the cooked database is retrieved and evaluated on two levels: URL validation and content validation. In the URL validation the task first checks and verifies that the links to http and https resources are valid. In essence, the system accesses the URL to verify the link connections. The second operation involves checking whether there are any warning response messages. If so, the listing may be flagged for manual review. The URL Validation operation also detects whether any of the links have been redirected or otherwise modified and determines support for session cookies. In the Content Validation part of the quality Manager task, checks are made for inconsistencies in the data. For example, various checks such as performing specified rules, verifying the job description, conducting a matching algorithm on the description, and verifying match between city, state and country. Finally, the quality manager process may be accomplished with n separate threads that operate concurrently. Each quality manager task thread operational flow is shown in FIG. 13.

The rule based quality engine task module 142 performs a series of operations on each data set processed through the sequence 500 shown in FIG. 5. The configuration manager 158 determines how many listing manager modules 104 are available. In addition, within each listing manager module 104 the quality manager task 144 may manage "N" quality manager task threads 167 and 169. Specifically, at operation 524, the operational sequences 1300 are called by the quality engine module task managers 142. Each quality manager task manager 142 may have control of "n" threads 1300. Each sequence 1300 begins in operation 1302 where the required registers are initialized. Control then transfers to operation 1304. In operation 1304, depending on how many quality engine manager 142 threads are available, and how many threads 1300 are assigned, as determined by the configuration generator 158, the data sets in the cooked database 236 to be examined for quality are retrieved. Control then transfers to operation 1306. Here the data sets are split into n partitions. Thus the number of data sets in one partition corresponds to the number of threads 1300 available within the partition. Control then transfers to operation 1308. The following operations are performed for each data set in each of the partitions in parallel.

In operation 1308 each data set is compared against a set of document rules. For example, these rules include determination whether the job description text field has at least 5 or more words in it, whether the job title field is filled, i.e. not null, whether the job company name field is filled, i.e., not null, and whether the job location field is filled, i.e. not null. If any of these fields are null or contrary to the rule, the data set fails the document rules and will not be indexed. Control then passes to query operation 1310. In query operation 1310 the question is asked whether the data set passed the rules tests. If the answer is yes, control transfers to operation 1316. If the answer is no, control transfers to operation 1312 where an error flag is set, and then to operation 1314 where a record of the missing data is sent to the reporting module 130. Control then transfers to operation 1316.

In operation 1316, the location fields of the data set are checked to verify that the location of the city corresponds to the state listed in the state field and country corresponds accordingly. Control then transfers to operation 1318. Query operation 1318 asks whether the data set passed each of the location verification tests. If the answer is yes, control transfers directly to operation 1324. If the answer is no, again an error flag is set in operation 1320 and a location error report is sent to the report module 130 in operation 1322. Control then transfers to operation 1324.

In operation 1324 the content of each of the fields in the data set being examined is compared to a set of profane or impermissible words to determine whether there is any profanity or otherwise unacceptable words in the data set. Control then transfers to query operation 1326 which asks whether any profane or unacceptable language was found. If there were unacceptable words found, control transfers to operation 1328 where an error flag is set and to operation 1330 where an error report of the unacceptable language is sent to the report module 130. On the other hand, if no profanity was found, control transfers directly to operation 1332.

In operation 1332, any preliminary IRL address is accessed and is checked to determine whether any error messages are generated upon access. In addition, if there are any session cookies required these are recorded in this operation. Pre-URL addresses and cookie information may be present or required in some sites requiring access information, for example, prior to a user getting to the desired URL. This operation verifies that any preliminary URL information in the data set is current and correct. If there are any error messages, these are noted. Control then transfers to query operation 1334. Query operation 1334 asks whether there were any error messages received when the pre-URL address was called. If the answer is no, control transfers directly to operation 1340. If the answer is yes, there were errors, again an error flag is set in operation 1336 and an error report sent to the reports module 130 in operation 1338. Control then transfers to operation 1340.

In operation 1340 the final URL address is called and any session cookies required are recorded. At this time any error messages are noted. This operation is important in order to verify that the data set still remains current in the database. Especially in the case of job posting data sets, the job may have been filled just the day before. In such a case, the posting may be cleared, yet the database still thinks the job is current. This operation 1340 attempts to catch such recent change situations and accommodate such activity. In many instances this operation is successful and helps ensure that the database is maintained current. Control then transfers to query operation 1342, where the question is asked whether there were any error messages, such as would indicate that the job had been pulled, for example. If no error messages were received, control transfers to operation 1348. However, if error messages were received, control transfers to operation 1344 where an error flag is set, and then to operation 1346, where an error report is sent to the reporting module 130. Control then passes to return operation 1360 since the URL is invalid if errors were received, and the data set will not be indexed and returned to the cooked database 236.

In operation 1348, the web page at the URL is downloaded for examination. Control then transfers to operation 1350 where the web page is cleansed of HTML data as was previously done in the data cleanser module 139. Control then transfers to operation 1352. In operation 1352, the data set content is matched word for word to the web page content. This operation verifies that the data set correctly reflects the web page, which is another verification mechanism that the listing is current. Control then transfers to query operation 1354. Query operation 1354 asks whether there were any errors in the matching operation 1352. If there were errors, then the data set is corrupt, or the job posting is somehow different, and therefore it will be returned to the cooked database and not indexed for forwarding to the search bank 246. Accordingly, the answer is yes, so control transfers to operation 1356 where an error flag is set, then to operation 1358, where an error report is sent to the reporting module 130, and then control passes to return operation 1360.

In each case where an error flag is set, operations 1312, 1320, 1328, 1336, 1344, 1356, the set flag will prevent the data set from being indexed and returned to the cooked database for forwarding to a search bank. However, a copy of the data set will be made available in the cooked database for an administrator to examine in the quality review module 126.

Return operation 1360 returns control to task 500 at operation 524, which then transfers control to operation 526 where another series of rules based tasks are performed. Overall control then returns in operation 528.

Although functional components, modules, software elements, hardware elements, and features and functions described herein maybe depicted or described as being fixed in software or hardware or otherwise, it will be recognized by persons of skill in the art that the features and functions described herein maybe implemented in various software, hardware and/or firmware combinations and that the functions described herein may be distributed into various components or subcomponents on the network and are not fixed to any one particular component as described herein. Thus the databases described may be separated, unified, federated, or otherwise structured to best suit the preferences of the implementer of the features and functions described herein. Also, the functions described herein as preferably being performed manually maybe performed manually or maybe divided into subtasks which may be automated and ultimately performed by intelligent subsystems which mimic human operator interaction such as artificial intelligence systems which maybe trained by human operations and ultimately function autonomously. Further features, functions, and technical specifications are found in the attached descriptions further below as well as the figures contained therein.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims. All patents, patent applications and printed publications described, referred to or discussed herein are hereby incorporated by reference herein in their entirety.

What is claimed is:

1. A computer system comprising:
   a module, executing on a computing device, for managing capture and processing of job listing information data sets captured through a data network from a plurality of sources for compilation into a searchable data structure;
   an administrative portal module executing on the computing device and providing system administration and operational control through a network interface;
   one or more task manager modules executing on the computing device and, responsive to instructions provided via the administrative portal module, operable to control access to the job related sources, control retrieval of the job listing information data sets comprising data fields and process the job information data sets received from those sources, examine the data fields for conformance to predetermined quality criteria, categorize the job listing information data sets, and store the categorized job information data sets for use in a job search bank,
   wherein the quality criteria comprise document rules, the document rules applied to each listing within the data fields, and wherein if a job listing information data set fails one or more of the document rules, the listing information data set will be flagged for quality review.

2. The system according to claim 1 wherein the data network includes the Internet.

3. The system according to claim 1 wherein each task manager module comprises:
   a scraping management module coordinating operation of and communication between one or more job scraping engines to obtain scraped job information data sets from corporate career sites and job boards identified by a site management module in the administrative portal module and store the scraped data sets in a database; and
   a quality management module coupled to the scraping management module analyzing data fields of each scraped job data set stored in the database for conformance to predetermined quality rules.

4. The system according to claim 3 wherein the task manager module further comprises:
   a job listing data categorization module operable to examine and categorize each job data set stored in the database into one or more of a predetermined set of job categories and return categorized job data sets to the database; and
   a search bank synchronizer communicating with the database for compiling and transferring categorized job data sets from the database to the job search bank.

5. The system according to claim 1 wherein the categorization module comprises:
   a job categorization database; and
   a categorization module determining a confidence value in each predetermined job category for each scraped job listing information data set by comparing text of each scraped job data set with previously categorized job data text in the job categorization database.

6. The system according to claim 4 wherein the administration portal comprises a categorization review module permitting a reviewer to verify categorizations determined by the document categorization platform service.

7. The system according to claim 4 wherein each job data set returned to the database comprises an assigned job category determined by the categorization module and an assigned confidence value for that category.

8. The system according to claim 7 wherein each data set returned to the database further comprises a confidence value for each predetermined job category.

9. The system according to claim 5 wherein each job data set returned to the database comprises a manual review flag set if the assigned confidence value is below a predetermined threshold value.

10. The system according to claim 1 wherein the quality management module sets a quality flag associated with each scraped job data set comprising data fields not meeting the predetermined criteria.

11. The system according to claim 10 wherein the administrative portal further comprises a quality review module communicating with the quality management module permitting a reviewer to manually examine job data sets for which the quality flag has been set.

12. A method of obtaining, handling and compiling job information data sets comprising:
   receiving, by a computing device, in one of a plurality of job listing management modules operational instructions from an administrative portal module;
   scraping, by the computing device, job information data sets from one or more job listings on one or more corporate career sites or job boards available through the Internet, the job information data sets comprising data fields;
   storing, by the computing device, a job data set corresponding to each scraped job listing in a database;
   analyzing, by the computing device, the data fields of each scraped data set stored in the database for conformance to predetermined quality criteria, wherein the quality criteria comprise document rules, the document rules applied to each data field of each job information data set, and wherein if a job information data set fails one or more of the document rules, the job information data set will be flagged for quality review; and
   categorizing, by the computing device, each data set stored in the database into one or more predetermined job categories and returning the categorized job information data set to the database.

13. The method according to claim 12 further comprising obtaining job information data sets from one or more of customer sites through an XML feed.

14. The method according to claim 12 wherein the categorizing operation further comprises:
   assigning a confidence value for each job information data set for each of the predetermined job categories.

15. The method according to claim 12 wherein the categorizing operation comprises:
   comparing text of each scraped job information data set with text of previously categorized job information data sets in a job categorization database; and
   determining a confidence value in each predetermined category for each scraped data set.

16. The method according to claim 15 further comprising:
   flagging each categorized scraped data set that has a confidence value below a predetermined value for manual review; and
   providing a manual review module permitting a reviewer to verify any flagged categorizations through an administration portal.

17. The method according to claim 12 further comprising assigning a confidence value for the job category assigned to each data set returned to the database.

18. The method according to claim 17 further comprising flagging any data set returned to the database having an assigned confidence level below a predetermined threshold.

19. The method according to claim 12 further comprising:
   transferring selected categorized job information data sets from the job search bank through a web client server cluster to a job seeker in response to a query by the job seeker.

20. The method according to claim 12 wherein the scraping operation further comprises:
   accessing one of the job boards or corporate career sites through the Internet;
   flagging any scraped job information data set having data fields not meeting the predetermined quality criteria;
   permitting a manual review of flagged job information data sets returned to the database, and the categorizing operation further comprises
   comparing data in each scraped job information data set with previously categorized job data set data in a categorization database; and
   determining a confidence value in each predetermined job category for each scraped job information data set.

21. The method according to claim 20 further comprising:
   flagging each categorized scraped data set that has a confidence value below a predetermined value for manual review; and providing a manual review module in an administration portal permitting a reviewer to verify any flagged categorizations.

22. The method according to claim 20 further comprising transferring selected categorized data sets from the search bank through a web server to a user in response to a query by the user.

23. A computer readable storage medium encoding a computer program of instructions for executing a computer process for scraping job description data from corporate career sites and job boards, the computer process comprising:

scraping listing information data sets comprising data fields from one or more listings on sites available through the Internet;

storing the scraped data sets in a database;

analyzing the data fields of each scraped data set stored in the database for conformance to predetermined quality criteria, wherein the quality criteria comprise document rules, the document rules applied to each listing within the data fields, and wherein if one of the data fields fails one or more of the document rules, the listing information data set comprising the one of the data fields will be flagged for quality review; and categorizing each data set stored in the database into one or more predetermined categories and returning the categorized data set to the database.

24. The computer readable storage medium of claim 23 wherein the process further comprises:

flagging any scraped data set comprising data fields not meeting the predetermined quality criteria;

permitting a manual review of flagged data sets returned to the database, and wherein the categorizing operation further comprises;

comparing text in each scraped data set with previously categorized data set text in a categorization database; and determining a confidence value in each predetermined category for each scraped data set.

* * * * *